United States Patent
Menner et al.

(10) Patent No.: US 12,474,705 B2
(45) Date of Patent: Nov. 18, 2025

(54) TASK-SPECIFIC AND ENVIRONMENT-SPECIFIC ADAPTIVE CONTROL OF LEGGED ROBOT

(71) Applicant: Mitsubishi Electric Research Laboratories, Inc.

(72) Inventors: Marcel Menner, Arlington, MA (US); Stefano Di Cairano, Newton, MA (US); Alexander Schperberg, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 442 days.

(21) Appl. No.: 18/062,167

(22) Filed: Dec. 6, 2022

(65) Prior Publication Data

US 2023/0376034 A1 Nov. 23, 2023

Related U.S. Application Data

(60) Provisional application No. 63/365,164, filed on May 23, 2022.

(51) Int. Cl.
*B25J 9/16* (2006.01)
*B62D 57/032* (2006.01)
*G05D 1/00* (2006.01)

(52) U.S. Cl.
CPC ............ *G05D 1/0088* (2013.01); *B25J 9/163* (2013.01); *B25J 9/1633* (2013.01); *B62D 57/032* (2013.01)

(58) Field of Classification Search
CPC ....... B25J 9/1633; B25J 9/163; B62D 57/032; G05D 1/0088; G05D 2201/0217
See application file for complete search history.

(56) References Cited

U.S. PATENT DOCUMENTS

| 9,079,624 B2 * | 7/2015 | Park ...................... B25J 9/162 |
| 2007/0126387 A1 * | 6/2007 | Takenaka ............. B62D 57/032 318/568.2 |

(Continued)

OTHER PUBLICATIONS

J. Di Carlo, P. M. Wensing, B. Katz, G. Bledt, and S. Kim, "Dynamic Locomotion in the MIT Cheetah 3 Through Convex Model-Predictive Control," IEEE/RSJ International Conference on Intelligent Robots and Systems, 2018.

(Continued)

*Primary Examiner* — Dalena Tran
(74) *Attorney, Agent, or Firm* — Gene Vinokur

(57) ABSTRACT

A control system for controlling a legged robot comprises a processor and a memory. The control system initializes, in response to receiving a task, a probabilistic filter with parameters associated with a state of a reference trajectory of the legged robot, wherein the parameters are predetermined for the task and encode the reference trajectory including a combination of different reference trajectories for coordinated motion primitives of different actuators of the legged robot moving the legged robot according to the task, decodes the parameters to generate the reference trajectory, and executes, in response to receiving a feedback signal, the probabilistic filter to iteratively track the state of the reference trajectory satisfying a performance objective with respect to the state of the legged robot to update the parameters.

19 Claims, 19 Drawing Sheets

(56) References Cited

U.S. PATENT DOCUMENTS

2021/0162589 A1\* 6/2021 Tan ..................... B62D 57/032
2021/0171135 A1\* 6/2021 Blankespoor .......... G05D 1/245
2022/0016775 A1\* 1/2022 Kitagawa ............. B62D 57/032

OTHER PUBLICATIONS

A. W. Winkler, D. C. Bellicoso, M. Hutter, and J. Buchli, "Gait and Trajectory Optimization for Legged Systems through Phase-based End-Effector Parameterization," IEEE Robotics and Automation Letters, 2018.

U.S. Appl. No. 17/403,222, "System and Method for Calibrating Feedback Controllers", filed Aug. 16, 2021, pp. 1-79.

\* cited by examiner

| Parameters 1301 | Type of Basis Function 1302 | Example of Basis Function 1303 |
|---|---|---|
| Walking Speed 1301a | Basis function for Center of Mass 1302a | Linear or constant basis function 1303a |
| Foot clearance/step Height 1301b | Basis function for feet 1302b | Cycloidal basis function 1303b |
| Turn Rate 1301c | Basis function for Center of Mass 1302a | Linear or constant basis function 1303a |
| Stair Height 1301d | Basis function of feet 1302b | Cycloidal basis function with variable touchdown height 1303c |

FIG. 13

TASK-SPECIFIC AND ENVIRONMENT-SPECIFIC ADAPTIVE CONTROL OF LEGGED ROBOT

TECHNICAL FIELD

The present disclosure relates generally to control systems, and more particularly to system and method for reference trajectory state generation for a legged robot.

BACKGROUND

Legged robots can assist humans in their everyday needs or daily activities to increase mobility. Examples of the activities that the legged robots can assist in include carrying load such as groceries or construction materials, search and rescue missions, doing household chores, and the like. To perform these activities, the legged robots operate in unstructured, uncertain, and changing environment and hence they are often more complex in nature. This complex nature of the legged robot necessitates an adaptable control system such that it adapts to the changing environments and to the changing intents of the human who are being assisted. The control system also needs to be quickly adaptable to accommodate the agility of the legged robot.

The control system of the legged robot includes a stance controller and a swing controller, to follow a reference trajectory. The reference trajectory defines a task for the legged robot. The stance controller and the swing controller are executed with high frequency. The reference trajectory is often pre-computed and stored in a memory and not adjusted online since computing the reference trajectory in real-time is more computationally expensive. However, complex tasks and changing environments require the legged robot to adjust the reference trajectory. Also, it is not practically feasible to pre-compute all possible reference trajectories that are required for the movement of the legged robot and store them in a database.

Accordingly, there is a need for a system that can adapt a given reference trajectory of the legged robot in a changing environment and/or adjust as per the current needs of the legged robot in an efficient and feasible manner.

SUMMARY

Control of the robotic systems often includes motion planning for generating a reference trajectory governing the control. Generating the reference trajectory is a challenging and computationally expensive task, especially in the presence of a changing environment surrounding a robot. This problem is even more challenging for controlling legged robots. A legged robot has a body and multiple legs requiring coordinated control. A reference trajectory for the legged robot is a combination of multiple reference trajectories that jointly define a coordinated motion of different actuators of the legged robot. Generating the coordinated reference trajectories for each possible type of motion of the legged robot is a challenging task requiring expensive computational power often absent in the robots.

The present disclosure is directed towards a control system and method for controlling the operation of a legged robot. The control system initializes, in response to receiving a task, a probabilistic filter with parameters associated with a state of a reference trajectory of the legged robot. The task can be received from a supervisory controller and includes one of or a combination of walking, turning left or right, climbing stairs, high-stepping gait, trotting, etc. The parameters of the probabilistic filter are predetermined for the task and encode the reference trajectory including a combination of reference trajectories for coordinated motion primitives of different actuators of the legged robot to move the legged robot according to the task. The parameters are decoded to generate the reference trajectory.

Upon generating the reference trajectory, the probabilistic filter is executed, in response to receiving a feedback signal indicative of a change of a state of the legged robot moving according to the trajectory, to iteratively track the state of the reference trajectory satisfying a performance objective with respect to a state of the legged robot to update the parameters, wherein the performance objective includes one or a combination of requirements for (i) a desired foot clearance/step height of the legged robot, (ii) a desired walking speed of the legged robot, (iii) a desired turn rate of the legged robot, (iv) a desired stair height for climbing stairs, (v) a desired energy consumption of the legged robot, (vi) a desired foot slippage of the legged robot, and (vii) a desired ground reaction force of the legs of the legged robot. The feedback signal is accepted in response to detecting a new touch with a surface by at least one leg of the legged robot. The reference trajectory is updated by decoding the updated parameters. The control inputs to actuators of the legged robot are generated based on the updated reference trajectory and the actuators of the legged robot are controlled based on the corresponding control inputs.

The probabilistic filter is configured to predict a current state of the reference trajectory based on a previous state of the reference trajectory using a prediction model. The probabilistic filter accepts a feedback signal indicative of a current state of the legged robot and/or a state of an environment surrounding the robot and updates the current state of the reference trajectory based on the feedback signal, using a measurement model testing the performance objective subject to measurement noise. The prediction model is an identity model and is subject to process noise and the measurement model is subject to measurement noise. The probabilistic filter includes an extended Kalman filter (EKF) or an unscented Kalman filter (UKF).

According to an embodiment, a control system for controlling a legged robot is provided. The control system comprises a processor; and a memory having instructions stored thereon that, when executed by the processor, causes the control system to initialize, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot moving the legged robot according to the task. The control system is further caused to decode the parameters to generate the reference trajectory and to execute, in response to receiving a feedback signal indicative of a change of a state of the legged robot moving according to the trajectory, the probabilistic filter to iteratively track the state of the reference trajectory. The tracked state of the reference trajectory satisfying a performance objective with respect to the state of the legged robot to update the parameters. The control system is further caused to update the reference trajectory by decoding the updated parameters and to generate control inputs to actuators of the legged robot based on the updated reference trajectory. Further, the control system is caused to control the actuators of the legged robot based on the corresponding control inputs.

According to another embodiment, a method for controlling a legged robot is provided. The method comprising initializing, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot moving the legged robot according to the task. The method further comprising decoding the parameters to generate the reference trajectory. The method further comprising, executing, in response to receiving a feedback signal indicative of a change of a state of the legged robot moving according to the trajectory, the probabilistic filter to iteratively track the state of the reference trajectory satisfying a performance objective with respect to the state of the legged robot to update the parameters. The method further comprising updating the reference trajectory by decoding the updated parameters and generating control inputs to actuators of the legged robot based on the updated reference trajectory. The method further comprising controlling the actuators of the legged robot based on the corresponding control inputs.

According to yet another embodiment, a non-transitory computer readable medium storing a program causing a legged robot to execute a reference trajectory state generation process is provided. The process comprising initializing, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot moving the legged robot according to the task. The process further comprising decoding the parameters to generate the reference trajectory. The process further comprising executing, in response to receiving a feedback signal indicative of a change of a state of the legged robot moving according to the trajectory, the probabilistic filter to iteratively track the state of the reference trajectory satisfying a performance objective with respect to the state of the legged robot to update the parameters. The process further comprising updating the reference trajectory by decoding the updated parameters and generating control inputs to actuators of the legged robot based on the updated reference trajectory. The process additionally comprising controlling the actuators of the legged robot based on the corresponding control inputs.

The advantages of the present disclosure include storing only a set of pre-computed reference trajectories along with techniques to adapt the pre-computed reference trajectories to match the current task and/or the current environment instead as storing all possible reference trajectories is practically not possible.

BRIEF DESCRIPTION OF DRAWINGS

FIG. 13 illustrates a table representing the encoding/decoding of parameters according to some embodiments of the present disclosure.

DETAILED DESCRIPTION

Figure 1:
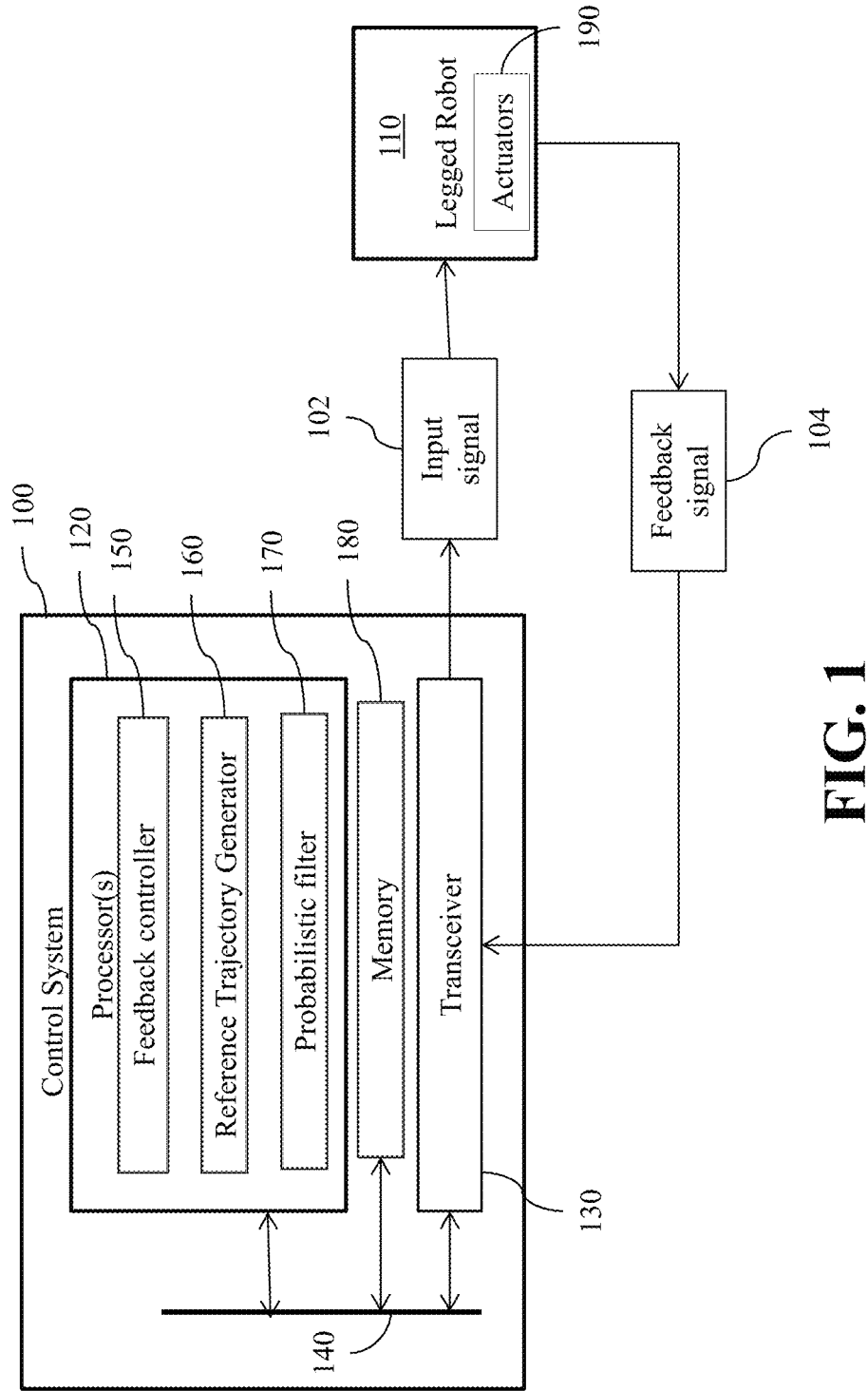
FIG. 1 illustrates a block diagram of a control system for controlling an operation of a legged robot, according to some embodiments of the present

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Control of the robotic systems often includes motion planning for generating a reference trajectory governing the control. Generating the reference trajectory is a challenging and computationally expensive task, especially in the presence of an uncertain and/or changing environment surrounding a robot. To address the uncertainty of the environment, a number of methods use sophisticated techniques for motion planning and control for tracking reference trajectories under uncertainty.

Some embodiments are based on conceptualizing a reference trajectory as a virtual system having a state instead of or in addition to tracking and adjusting the state of the robot following a reference trajectory. Accordingly, a reference trajectory is a virtual system having a state that can change based on the environment. This representation allows to track and adjust the state of the reference trajectory itself by adapting some principles borrowed from tracking and adjusting the state of the robot.

For example, some control methods use probabilistic filters that track the state of the robot based on the change of the control inputs to the robot. Examples of such a filter include a Kalman filter. Example embodiments parameterize the probabilistic filter on the state of the reference trajectory to track the state of the reference trajectory based on the changes in the environment. This tracking can be subjected to a performance objective which is imposed on the tracked state by either the prediction model of the filter, the measurement model of the filter, or a combination thereof.

Advantages of the present disclosure include: tracking the reference trajectory satisfying the performance objective with respect to the environment allows to simplify the generation of the reference trajectory, use of legacy control policies, desynchronize modification of the reference trajectory from the control, etc. Further the use of probabilistic filters, such as a Kalam filter, can be effectively executed by an embedded processor as the structure of the probabilistic filter is simpler than the structure of the filter used for tracking the state of the robot due to the simplified prediction model lacking inertia of the motion model of the robot.

Some embodiments are based on the fact that controlling the robot to execute a task often requires a reference trajectory that the robot is supposed to track. For example, a drone that is supposed to deliver an object or to monitor traffic may require a reference trajectory comprising the position of the drone and the velocity of the drone. As another example, a cleaning robot that is supposed to clean the floors may use reference trajectories to efficiently plan its movements. As another example, an assembly robot may use reference trajectories to maneuver parts in order to safely assemble a product. Some robots such as the assembly robot may need to reach a destination such as a particular placement of the part, while some other robots such as the drone or a mobile robot may need to execute a continuous task. The continuous task may require the reference trajectory that is used in a controller to be continuously re-computed or adapted to a current task and a current environment of the robot. The following descriptions and explanations use a legged robot as an example of such a robot that uses reference trajectories to achieve a task. However, the system and method in this disclosure should not be understood as limiting to the application of the legged robot.

Figure 5:
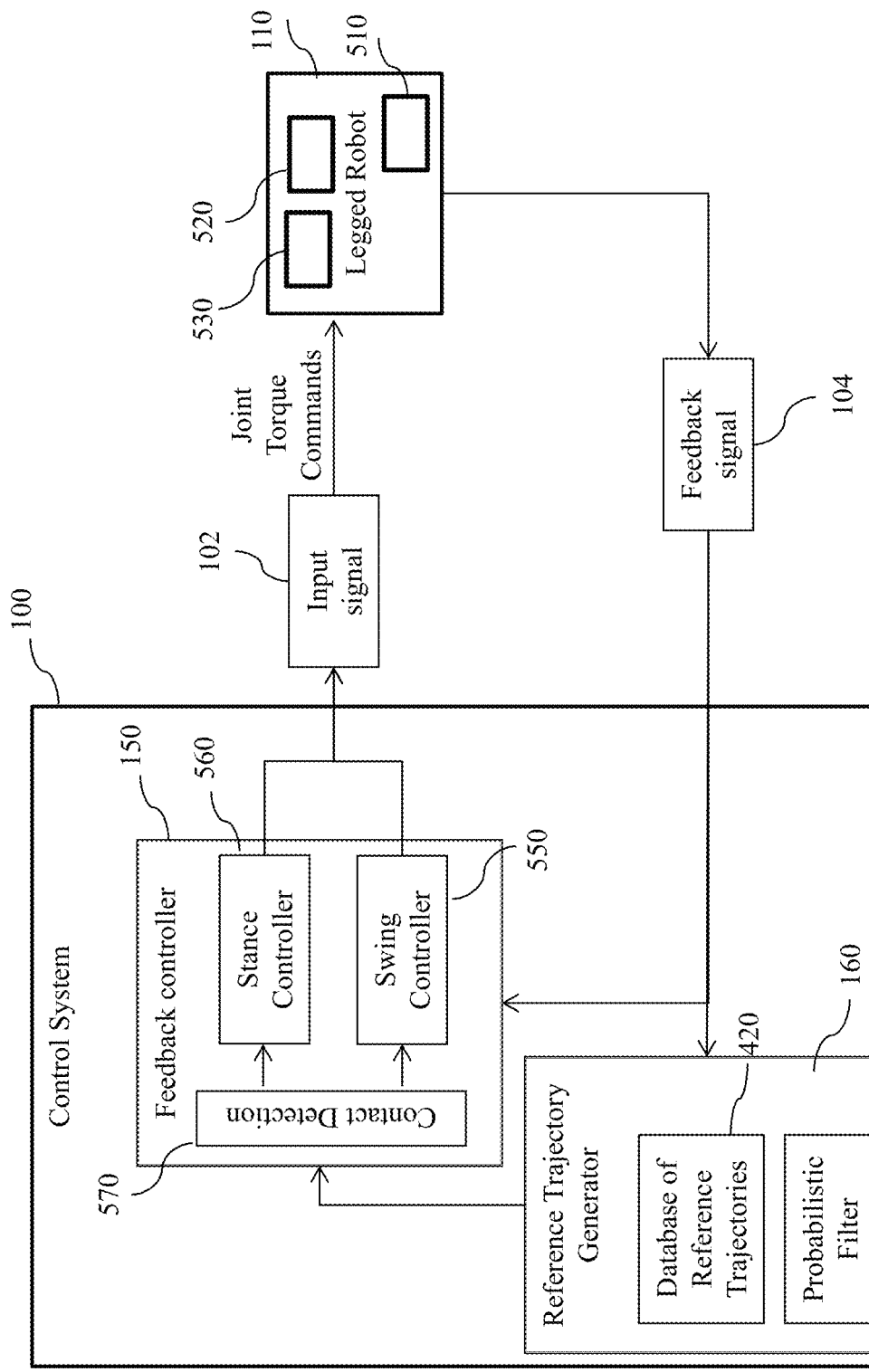
FIG. 5 illustrates an example of a control system for a legged robot, according to some embodiments of the present disclosure.

FIG. 5 illustrates a block diagram of a control system for controlling an operation of a legged robot, according to some embodiments of the present disclosure. Some embodiments are based on the recognition that an objective of the control system 100 is to control the legged robot 110 in engineered processes. To this end, the control system 100 may be operatively coupled to the legged robot 110. The control system 100 may include at least one processor 120, a transceiver 130, a memory 180 and a bus 140. The memory 180 may be embodied as a storage media such as RAM (Random Access Memory), ROM (Read Only Memory), hard disk, or any combinations thereof. For instance, the memory may store instructions that are executable by the at least one processor 120. The at least one processor 120 may be embodied as a single core processor, a multi-core processor, a computing cluster, or any number of other configurations. The at least one processor 120 may be operatively connected to the memory 180 and/or the transceiver 130 via the bus 140. According to an embodiment, the at least one processor 120 may be configured as a feedback controller 150, a reference trajectory generator 160 and/or a probabilistic filter 170. Accordingly, the feedback controller 150, the reference trajectory generator 160 and the probabilistic filter 170 may be embodied within the single core processor, the multi-core processor, the computing cluster, or any number of other configurations. Alternatively, the feedback controller 150 may be embodied outside the control system 100 and may be in communication with the control system 100. In one configuration, the reference trajectory generator 160 may be operatively coupled to the feedback controller 150, which in-turn may be coupled to the legged robot 110. For example, the feedback controller 150 may be, but are not limited to, a proportional integral derivative (PID) controller, an optimal controller, a neural network controller, or the like. The probabilistic filter 170 includes a Kalman filter such as but not limited to an unscented Kalman filter (UKF) or an extended Kalman filter (EKF).

According to an embodiment, the feedback controller 150 may be configured to determine a sequence of control inputs to control a set of actuators 190 of the legged robot 110. Further, controlling the actuators 190 of the legged robot 110 comprises coordinating a motor controlling the center of mass (CoM) of the legged robot 110 and motor associated with each leg of the legged robot 110. For example, the control inputs may be possibly associated with physical quantities such as voltages, pressures, forces, torques, or the like. In an example embodiment, the feedback controller 150 may determine the sequence of control inputs such that the sequence of the control inputs change states of the legged robot 110 in order to perform a specific task, e.g., tracking a reference. Once the sequence of control inputs is determined, the transceiver 130 may be configured to submit the sequence of control inputs as an input signal 102 to the legged robot 110. As a result, the states of the legged robot 110 may be changed according to the input signal 102 to perform the specific task. For instance, the transceiver 130 may be a radio frequency (RF) transceiver, or the like.

Further, the states of the legged robot 110 may be measured using one or more sensors installed in the legged robot 110. The one or more sensors may send a feedback signal 104 to the transceiver 130. The transceiver 130 may receive the feedback signal 104. In an example embodiment, the feedback signal 104 may include a sequence of measurements corresponding to the sequence of the control inputs respectively. For instance, the sequence of measurements may be measurements of the states outputted by the legged robot 110 in accordance with the sequence of the control inputs. Accordingly, each measurement in the sequence of measurements may be indicative of a state of the legged robot 110 caused by a corresponding control input. Each measurement in the sequence of measurements may be possibly associated with the physical quantities such as currents, flows, velocities, positions, and/or the like. In this way, the control system 100 may iteratively submit the sequence of control inputs and receive the feedback signals. In an example embodiment, in order to determine the sequence of control inputs in a current iteration, the control system 100 uses the feedback signal 104 that includes the sequence of measurements indicating current states of the legged robot 110.

In order to determine the sequence of control inputs in the current iteration, the feedback controller 150 may be configured to determine, at each control step, a current control input for controlling the legged robot 110 based on the feedback signal 104 including a current measurement of a current state of the legged robot 110. According to an embodiment, to determine the current control input, the feedback controller 150 may be configured to apply a control policy. As used herein, the control policy may be a set of mathematical equations that map all or a subset of states of the legged robot 110 to the control inputs. The mapping can be analytical or based on a solution to an optimization problem. In response to applying the control policy, the current measurement of the current state may be transformed into the current control input, based on the feedback controller 150 and values of parameters of reference trajectories in the reference trajectory generator 160. As used herein, the parameters of the reference trajectories may be a desired walking speed of the legged robot 110, a desired step height of a foot of the legged robot 110, a desired rotational velocity of the legged robot 110, and the like. Notably, the parameters of the reference trajectories should not be confused with the control inputs, which are outputs of the control policy, or with the states of the legged robot 110.

Figure 6:
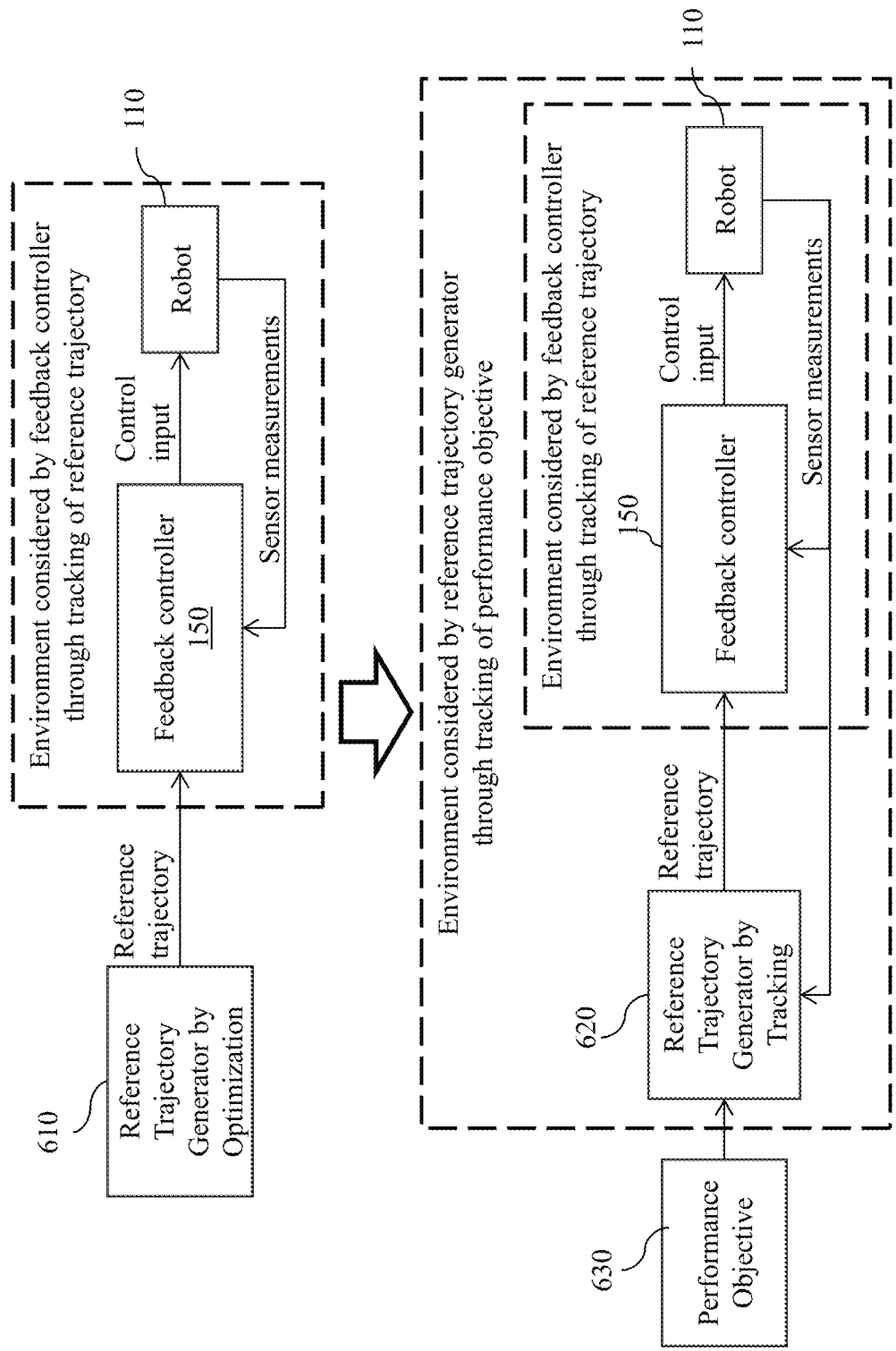
FIG. 6 illustrates the generation of the reference trajectory according to performance objective, according to some embodiments of the present disclosure.

FIG. 6 illustrates a probabilistic filter 170 predicting a state of a reference trajectory for the legged robot 110 according to some embodiments of the present disclosure. Accordingly, the probabilistic filter 170 accepts a feedback signal 104, wherein the feedback signal 104 includes a state of the legged robot 110 and/or a state of the environment in which the legged robot 110 is operating. The probabilistic filter 170 may be accept one or a combination of the state of the legged robot 110, which may be a current state of the legged robot 110, along with the state of the environment. The feedback signal 104 is processed by a prediction model 210 and a measurement model 220 of the probabilistic filter 170 to control a state of a reference trajectory 230 of the legged robot 110. The prediction model 210 is an identity model and is subject to process noise and the measurement model 220 is subject to measurement noise. The probabilistic filter 170 updates the current state of the reference trajectory based on the feedback signal using a measurement model testing the performance objective subject to the measurement noise. For example, the prediction model 210 predicts a current state of the reference trajectory 230 based on a previous state of the reference trajectory 230 and the measurement model 220 updates the current state of the reference trajectory based on the current state of the legged robot 110 and the state of the environment in which the legged robot is operating. The prediction model 210 may be an identity model subject to process noise that is configured to predict the state of the reference trajectory within a variance defined by the process noise.

In one embodiment the probabilistic filter 170 includes a Kalman filter. The Kalman filter is used to adjust the pre-computed reference trajectories to the current task and/or the current environment. The Kalman filter is a process (or a method) that produces estimates of unknown variables using a series of measurements observed over a time period, containing statistical noise and other inaccuracies. Indeed, these produced estimates of the unknown variables may be more accurate than an estimate of an unknown variable produced using a single measurement. The Kalman filter produces the estimates of the unknown variables by estimating a joint probability distribution over the unknown variables. The Kalman filter is a two-step process, which includes a predicting step and an updating step. In the predicting step, the Kalman filter uses a prediction model to predict the current states along with their uncertainties governed by a process noise. For instance, the prediction model may be artificially designed such that the prediction model is subjected to the process noise for reducing the uncertainties in the states, while predicting the current states. Indeed, the predicted current states may be represented by the joint probability distribution over the current states.

Figure 7:
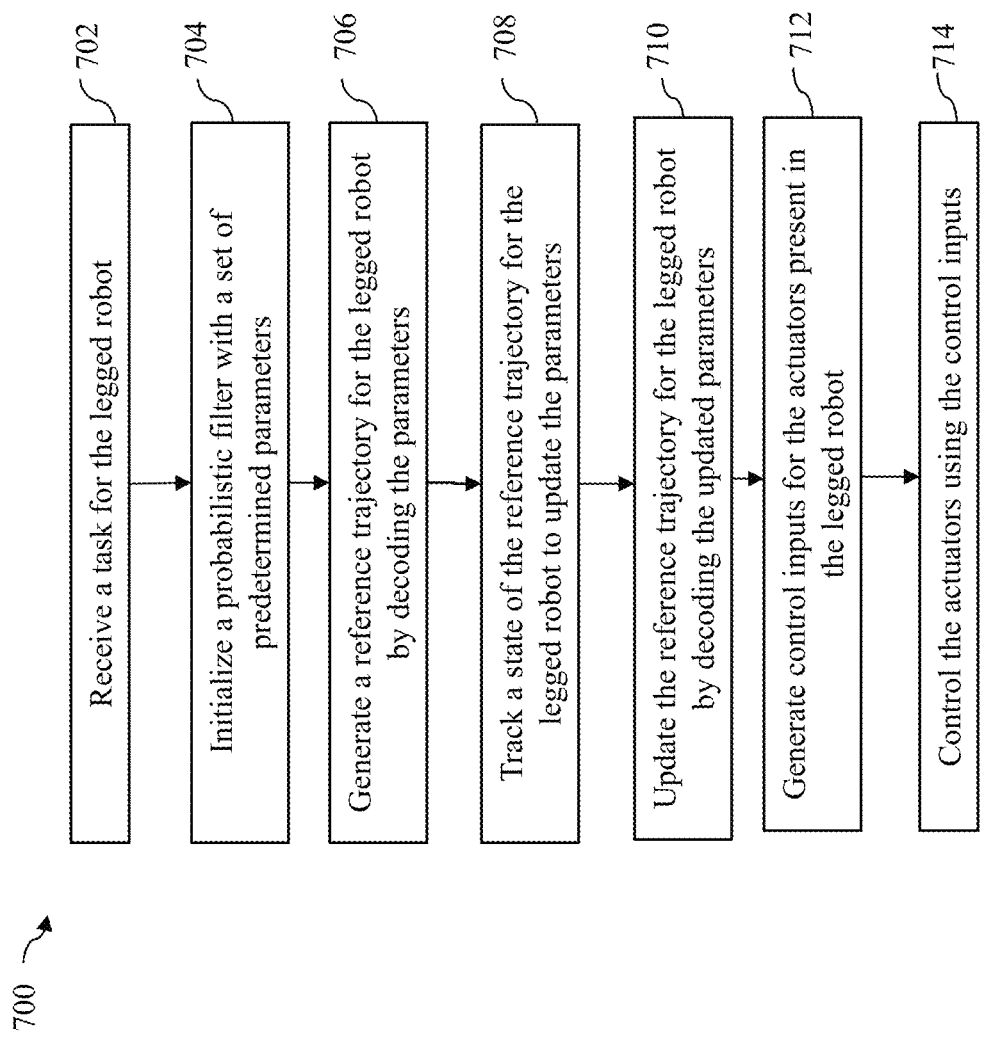
FIG. 7 illustrates a flow chart of a method for operating the legged robot, according to some embodiments of the present disclosure.

FIG. 7 illustrates a flow chart of a method 300 for estimating a reference trajectory for the legged robot 110 according to some embodiments of the present disclosure. All types of robots are required to perform continuous task which requires the reference trajectory that is used in a controller to be continuously re-computed or adapted to a current task and a current environment of the robot. The task includes such as, but not limited to, combination of walking straight, turning right or left, climbing stairs, high-stepping gait, trotting, etc. Accordingly, the values of the reference trajectory estimated by the probabilistic filter 170 is iteratively updated based on the performance objective. The performance objective comprises one or a combination of requirements for (i) a desired foot clearance/step height of the legged robot, (ii) a desired walking speed of the legged robot, (iii) a desired turn rate of the legged robot, (iv) a desired stair height for climbing stairs, (v) a desired energy consumption of the legged robot, (vi) a desired foot slippage of the legged robot, and (vii) a desired ground reaction force of the legs of the legged robot.

The method 300 begins with receiving a first task 310. For example, the task for robot to turn left is received by the control system 100. In response to receiving the first task 310, the probabilistic filter 170 is initialized with parameters associated with a current state of the reference trajectory of the legged robot 110. These parameters are predetermined for the task of turning left and are used to encode the reference trajectory for the task of turning left. This encoding may include a combination of different trajectories for a set of coordinated motion primitives for different actuators 190 of the legged robot 110 such that the legged robot 110 is able to turn left.

Thus, based on this initialization, estimation 320 of the value of the reference trajectory related to the first task is done. In an example, the parameters associated with the state of the reference trajectory of the legged robot 110 are decoded for the estimation.

Further, the feedback signal 104 may be received which indicates a change of a state of the legged robot 110 moving according to the reference trajectory. In response to receiving of the feedback signal 104, the probabilistic filter 170 is executed iteratively to track the state of the reference trajectory of the legged robot 110. Further, checking 330 is done to identify whether the performance objective is satisfied or not with respect to the state of the legged robot 110 to update the parameters of the probabilistic filter 170. If the performance objective is satisfied, then the method 300 proceeds with updating the reference trajectory until receiving 340 a second task, else the method proceeds directly to receiving the second task.

Also, the reference trajectory is updated by decoding the updated parameters of the probabilistic filter 170. Further, this updated trajectory is then used to generate the control inputs, such as the input signal 102, for the actuators 190 of the legged robot 110. Then, the actuators 190 are controlled as per the corresponding control inputs.

Figure 8:
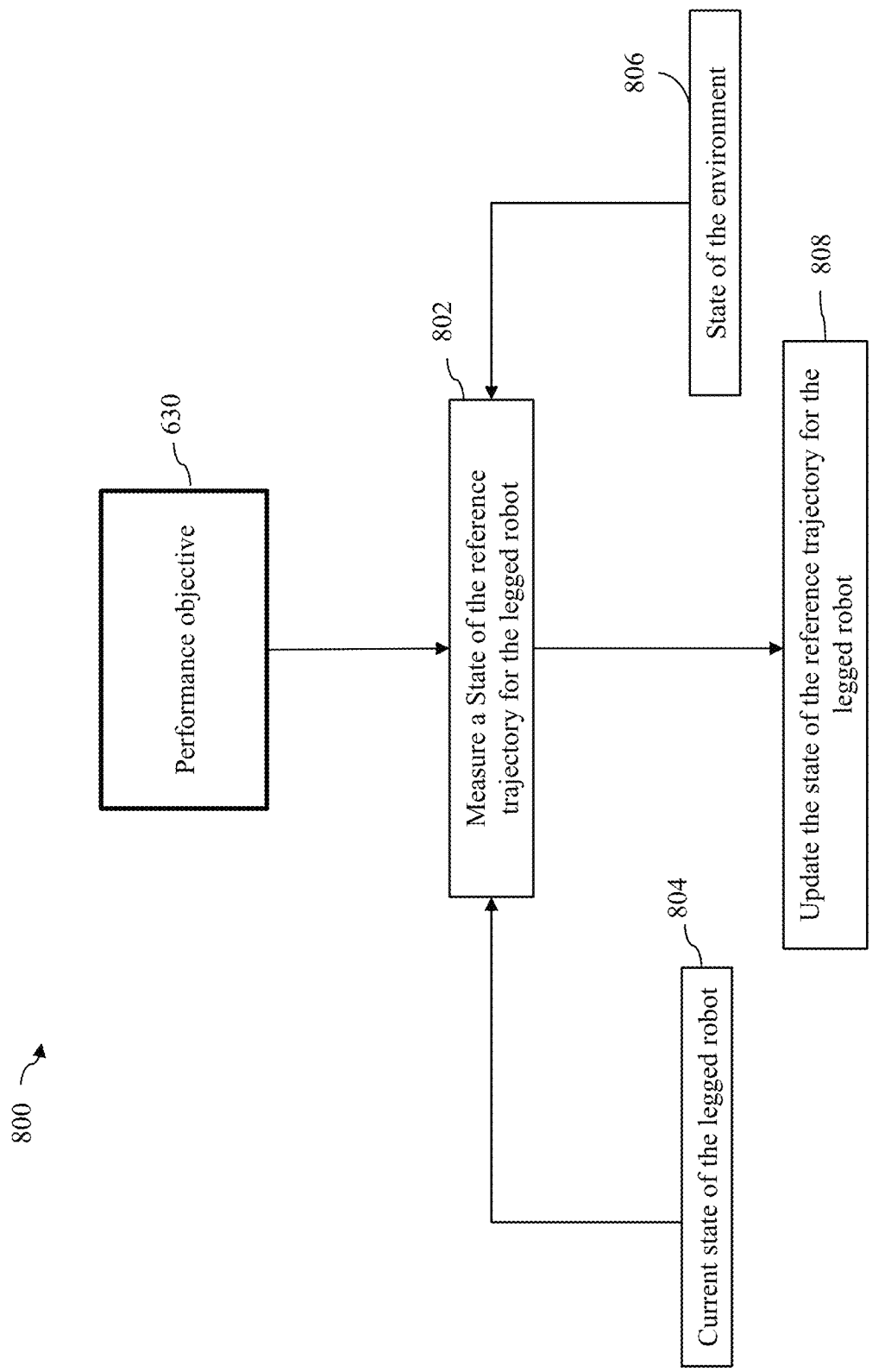
FIG. 8 illustrates a block diagram of a method for updating a state of the reference trajectory, according to some embodiments of the present disclosure.

FIG. 8 illustrates a block diagram of a control system for initiating and controlling an operation of a legged robot 110, according to some embodiments of the present disclosure. The control system 100 as discussed above with reference to FIG. 1 is in communication with a supervisory controller 410 and has access to a database 420. The control system 100 receives a task from a supervisory controller 410. The task may also be received from other sources, such as but not limited to, external sensors 430, voice command or a remote call. The task includes either one or a combination of walking, turning right or left, climbing stairs, high-stepping gait, trotting, etc. The supervisory controller 410 can be external to the control system 100 or in-built within the control system 100 or within the legged robot 110. Further, upon receiving the task, the control system 100 selects predetermined parameters from the database 420 based on the task and initializes the parameters of the probabilistic filter 170 with the selected predetermined parameters. The database 420 can be external to the control system 100 or in-built within the control system 100. The parameters are predetermined for the task and encode the reference trajectory including a combination of different trajectories for coordinated motion primitives of different actuators of the legged robot moving the legged robot according to the task. The parameters include one or multiple parameters of the reference trajectory such as (i) a foot clearance/step height of the legged robot, (ii) a walking speed of the legged robot, (iii) a turn rate of the legged robot, and (iv) a stair height for climbing stairs. The predetermined or pre-computed parameters are selected based on the performance objective such that the selected parameters are closest to some norm of the required target value.

For example, given a number of predetermined reference trajectories, the predetermined parameters of the reference trajectory that yields the lowest cost may be selected. The parameters of the chosen pre-computed reference trajectory may then be used and further adapted to satisfy the task and the required target values. For example, the parameters of the pre-computed reference trajectory associated with the lowest cost may be used to initialize the probabilistic filter 170. The requirement target value may be compared with the pre-computed reference trajectories in the database of reference trajectories.

The pre-computed reference trajectories in the database of reference trajectories may have requirement values associated, which may be used to compare the pre-computed reference trajectories with the required target value and determine which pre-computed reference trajectory fits the current task and its required target value most closely. For example, a squared 2-norm may be computed between the requirement target value and the associated requirement value of the pre-computed reference trajectories in the database of reference trajectories. Then, the pre-computed reference trajectory may be chosen that yields the smallest squared 2-norm.

In some embodiments the adapted reference trajectory that is currently utilized by the control system 100 is continuously compared with the required value of the pre-computed reference trajectories in the database 420 of reference trajectories. For example, the squared 2-norm may be computed between the required target value and the adapted reference trajectory currently employed by the control system 100. Further, the squared 2-norm may be computed between the required target value and the pre-computed reference trajectories in the database of reference trajectories. The adapted reference trajectory may be replaced by another pre-computed reference trajectory if the squared 2-norm may be lower. One advantage of continuously comparing the adapted reference trajectory with the pre-computed reference trajectories is that if the requirement target value shifts, it may be more efficient to switch the reference trajectory and re-initialize the tracking algorithm with a new set of parameters associated with the newly selected pre-computed reference trajectory.

FIG. 5 illustrates an example of a control system for a legged robot, according to some embodiments of the present disclosure. In order to control the motion of the legs of the legged robot 110, the control system 100 sends the input signal 102, which may be a torque command to electric motors of the legged robot 110. For example, the legged robot 110 with four legs may have three electric motors per leg, which include an electric motor for actuating a knee joint 510, an electric motor for actuating a hip joint 520, and an electric motor for actuating a thigh joint 530. The electric motor for actuating the knee joint 510 may control the flexion and extension of the knee joint. The electric motor for actuating the hip joint 520 may control the abduction and the adduction of the leg. The electric motor for actuating the thigh joint 530 may control the flexion and extension of the leg. In this example, the control system 100 sends twelve electric motor commands for the four legs of the legged robot 110. The control system 100 may include a stance controller 560, a swing controller 550, and a contact detection 570. The stance controller 560 stabilizes the legged robot 110 using the legs, which are in contact with the ground. The swing controller 550 moves the legs that are not in contact with the ground in order to correct the legged robot's position and/or to achieve forward progress. The stance controller 560 and the swing controller 550 may be designed to follow reference trajectories computed using the reference trajectory generator 160 as closely as possible. The feedback signal 104 controls the operation of the stance controller 560 and the swing controller 550 such that each of the stance controller and the swing controller generate torque commands for the operation of the legged robot, based on the feedback signal 104. The feedback signal 104 is accepted in response to detecting a new touch with a surface by at least one leg of the legged robot 110. For example, one of the four legs of the legged robot touches a surface or terrain associated with the ground that requires stabilization of the legged robot 110. As a result the feedback signal 104 is accepted from the new touch of the leg of the legged robot 110. Further, the current state of the reference trajectory of the legged robot 110 is updated and the reference trajectory generator 160 generates an updated reference trajectory. The updated reference trajectory generated by the reference trajectory generator 160 leads to generation of new or updated torque commands by the stance controller 560 and the swing controller 550 for the operation of the legged robot 110, to follow the updated reference trajectory. In this manner, the feedback signal 104 is configured to control the operation of the stance controller 560 and the swing controller 550 to generate the (updated) torque commands, so that the legged robot 110 is able to follow the updated reference trajectory.

In some embodiments, a database of reference trajectories 420 is used to store pre-computed reference trajectories in the memory. The pre-computed reference trajectories may include walking patterns of the legged robot 110 at different walking speeds, different turn radii, and the like. In some embodiments, the probabilistic filter 170, example Kalman filter is utilized to take and adjust the pre-computed reference trajectories to the current task and/or the current environment. One advantage of adjusting the pre-computed reference trajectories to the current task and/or the current environment is to control the legged robot 110 more accurately with a limited amount of the pre-computed reference trajectories. Hereinafter, the pre-computed reference trajectories refer to reference trajectories that are stored in the database of reference trajectories 420.

The stance controller 560 may be a model predictive controller (MPC), which aims at following a reference trajectory for the legged robot's CoM. The MPC may compute reaction forces of the legs that are in contact with the ground, $$\min_{x,f} \sum_{k=0}^{N} \|x_k - x_{k,ref}\|_Q + \|f_k\|_R \tag{1}$$

subject to $$f_{k,min} \le f_{k,z} \le f_{k,max}$$

$$-\mu f_{k,z} \le |f_{k,x}| \le \mu f_{k,z}$$

$$-\mu f_{k,z} \le |f_{k,y}| \le \mu f_{k,z}$$

$$x_{k+1} = Ax_k + Bf_k$$

$$D_k f_k = 0,$$

with the state $$x_k = \begin{bmatrix} \theta_k \\ r_k \\ \omega_k \\ v_k \end{bmatrix}, \tag{2}$$

where $\Theta_k \in \mathbb{R}^3$ is the legged robot's orientation, $r_k \in \mathbb{R}^3$ is the CoM base position, $\omega_k \in \mathbb{R}^3$ is the angular velocity, $v_k \in \mathbb{R}^3$ is the linear velocity, $\mu \in \mathbb{R}$ is the friction coefficient, $A \in \mathbb{R}^{12 \times 12}$ and $B \in \mathbb{R}^{12 \times 12}$ are the dynamic matrices (for state propagation), $D_k$ is a force selection matrix originating from the contact detection 570 (selecting forces that are not in contact to be equal to zero), and Q and R are diagonal positive semi-definite cost matrices. The joint torques (which are the input to the torque-controlled electric motors) may then be obtained using the forces $f_k$ resulting from the MPC (1) as $$\tau_{i,k} = J_{i,k}(R_{b,i,k}^w)^T(-_{i,k}), \tag{3}$$

where $f_{i,k} \in \mathbb{R}^3$ is the force vector associated with leg i as subset of $f_k \in \mathbb{R}^{12}$, and $R_{b,i,k}^w \in \mathbb{R}^{3 \times 3}$ is the rotation matrix from world to body frame of leg i at time step k. For example, the computed torque $\tau_{1,k} \in \mathbb{R}^3$ is the vector that includes the three commands for the electric motors of the first leg, i.e., for actuating the knee joint 510, for actuating the hip joint 520, and for actuating the thigh joint 530. The stance controller 560 may be executed at every sampling time step k, i.e., the torque commands may be re-computed at every sampling time step k.

The swing controller 550 may be based on a proportional feedback gain and a derivative feedback gain. The swing controller 550 aims at following reference trajectories for the legs defined by the sequence of positions $p_{i,k,ref}^b$, velocities $v_{i,k,ref}^b$, and accelerations $a_{i,k,ref}^b$, in the body frame, for each leg i. The swing controller 550 may use a model of the kinematics of each leg given by a Jacobian, and may use a proportional gain and a derivative gain, $$\tau_{i,k} = J_{i,k}[K_p(p_{i,k,ref}^b - p_{i,k}^b) + K_d(v_{i,k,ref}^b - v_{i,k}^b) + \Lambda_i(a_{i,k,ref}^b)] + V_{i,k}\dot{q}_{i,k} + G_{i,k}, \tag{4}$$

where $\tau_{i,k} \in \mathbb{R}^3$ is the joint torque, $q_{i,k} \in \mathbb{R}^3$ and $\dot{q}_{i,k} \in \mathbb{R}^3$ are the current joint position and velocity of foot i, $J_{i,k}$ is the foot Jacobian, $K_p \in \mathbb{R}^{3 \times 3}$ and $K_d \in \mathbb{R}^{3 \times 3}$ are the proportional and derivative (PD) gain matrices (3×3 diagonal positive semi-definite), $V_{i,k} \in \mathbb{R}^{3 \times 3}$ is the torque due to the coriolis and centrifugal forces, $G_{i,k} \in \mathbb{R}^3$ is the torque due to gravity, and $\Lambda_i \in \mathbb{R}^{3 \times 3}$ is the operational mass matrix. The swing controller 550 may be executed at every sampling time step k, i.e., the torque commands may be re-computed at every sampling time step k.

In such an exemplary feedback control system, the torque commands $\tau_{i,k}$ for all electric motors are thus computed either by the stance controller 560 (1) or the swing controller 550 (4), with the objective of tracking the reference trajectory for the legged robot's CoM and the reference trajectories for the legs. Thus, the feedback control system can be summarized as having the states of the legged robot 110 and the reference trajectories as inputs and the torque commands as outputs, $$\tau_{i,k} = \text{CTRL}(z_k, z_{k,ref}, z_{k+1,ref}, \ldots, z_{k+N,ref}), \tag{5}$$

where $z_k$ denotes a vector of all states of the legged robot 110 and $z_{k,ref}, z_{k+1,ref}, \ldots, z_{k+N,ref}$ denote the reference trajectories for such states for times k, k+1, . . . , k+N. For example, a different feedback control system with the same inputs and the same outputs, but with a different internal structure, is joint position control.

FIG. 6 illustrates the generation of the reference trajectory according to performance objective, according to some embodiments of the present disclosure. In some previous systems, the reference trajectories are generated using optimization 610, wherein only the environment is considered by the feedback controller 150. However, in an embodiment of the present disclosure the reference trajectory generator tracks a performance objective 630 besides considering the environment for generating the reference trajectories thereby improve accuracy of the control. In the present scenario, the reference trajectory generator by tracking 620 includes states that are used to generate reference trajectories. The states of the reference trajectory generator by the tracking 620 may be different than the states from the legged robot 110. For example, the states of the reference trajectory generator may include a walking speed of the legged robot 110, a foot clearance of the legged robot 110, a turning rate or turning angle of the legged robot 110, and the like. The states of the reference trajectory generator may then be used to generate the reference trajectory for the feedback controller 150 to follow.

Figure 4:
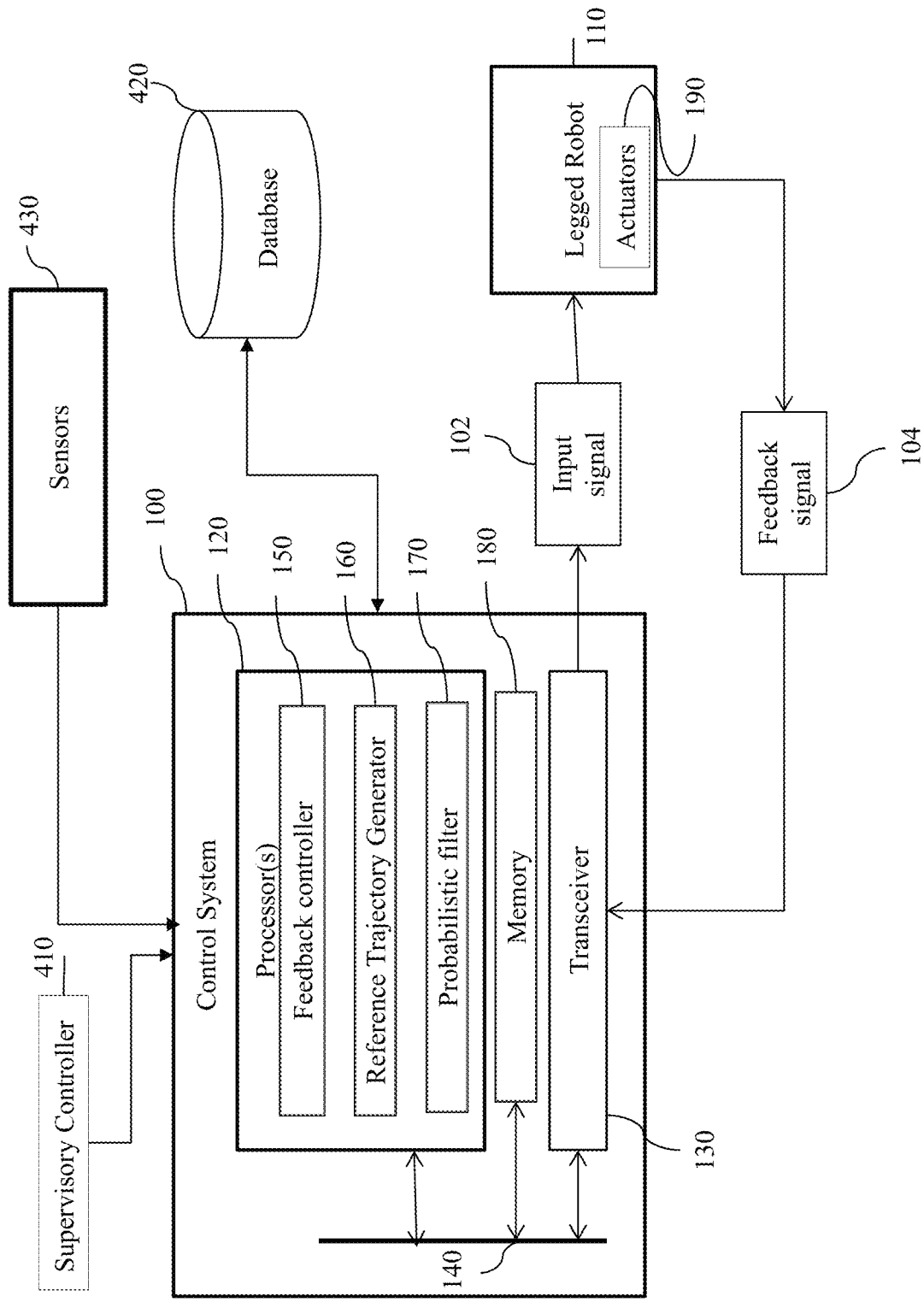
FIG. 4 illustrates a block diagram of a control system for initiating and controlling an operation of a legged robot, according to some embodiments of the present disclosure.

FIG. 7 illustrates a flow chart performing a method 700 for operating the legged robot, according to some embodiments of the present disclosure. The method 700 includes receiving a task 702 by the legged robot 110, such as the task of climbing some stairs by the legged robot 110. The control system 100 may be configured to receive the task, such as by inputting the task description on a user interface of the control system 100. In another example, the task may be received by a voice command. In yet another example, the task may be received from a supervisory controller, such as the supervisory controller 410 shown in FIG. 4.

In response to receiving the task, the probabilistic filter 170 is initialized 170 with a set of predetermined parameters related to the received task, wherein the parameters encode the reference trajectory including a combination of different trajectories for coordinated motion primitives of different actuators 190 of the legged robot 110 moving the legged robot 110 according to the received task. In an example, the predetermined parameters related to the received task may be stored in the database 420 and the control system 100 is configured to select the predetermined parameters from the database 420 based on the task and initialize the parameters of the probabilistic filter 170 with the selected predetermined parameters.

Figure 10:
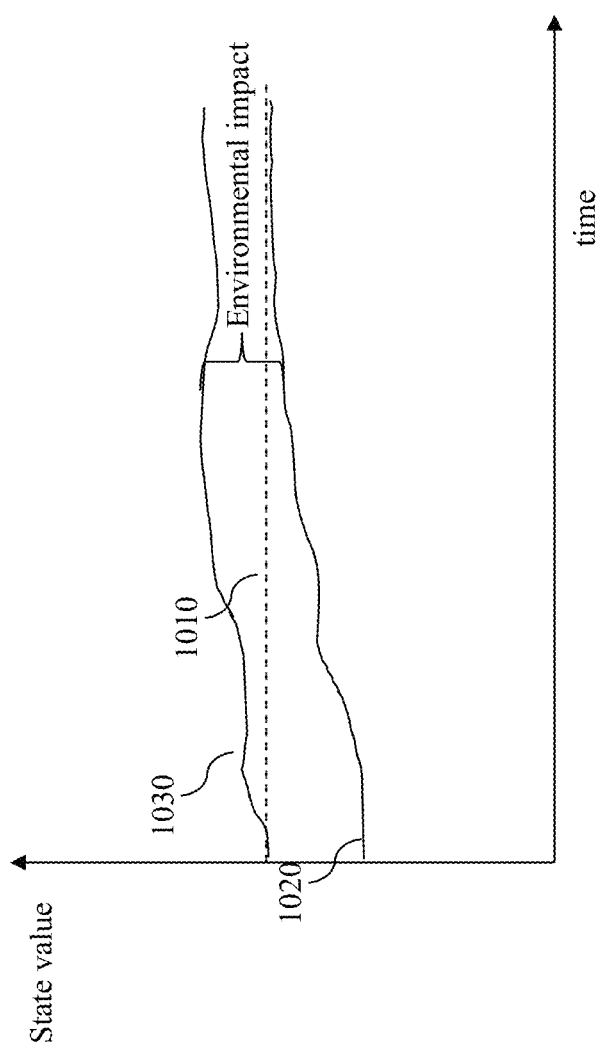
FIG. 10 illustrates a graph showing tracking the state of the reference trajectory, according to some embodiments of the present disclosure.

The method 700 further includes generating 706 a reference trajectory for the legged robot 110 by decoding the parameters and tracking 708 a state of the legged robot 110 to update the parameters. The tracking of the state of the reference trajectory for the legged robot 110 is illustrated in FIG. 10.

The method 700 further includes updating 710 the reference trajectory by decoding the updated parameters and generating 712 control inputs to the actuators 190 present in the legged robot 110 to control 714 the actuators 190 and thereby control the operation of the legged robot 110. The updating 710 of the reference trajectory is further explained in conjunction with FIG. 8.

FIG. 8 illustrates a block diagram of a method 800 for updating a state of the reference trajectory, according to some embodiments of the present disclosure. Updating 808 the state of reference trajectory of the legged robot 110 includes measuring 802 a state of the reference trajectory, applying a feedback signal relating to a current state 804 of the legged robot 110 and a state of the environment 806 on the predicted state 802 to get an updated state 808 of the reference trajectory. Further, the updating 808 of the state is subject to the performance objective 630. This is further explained in conjunction with FIG. 9.

Figure 9:
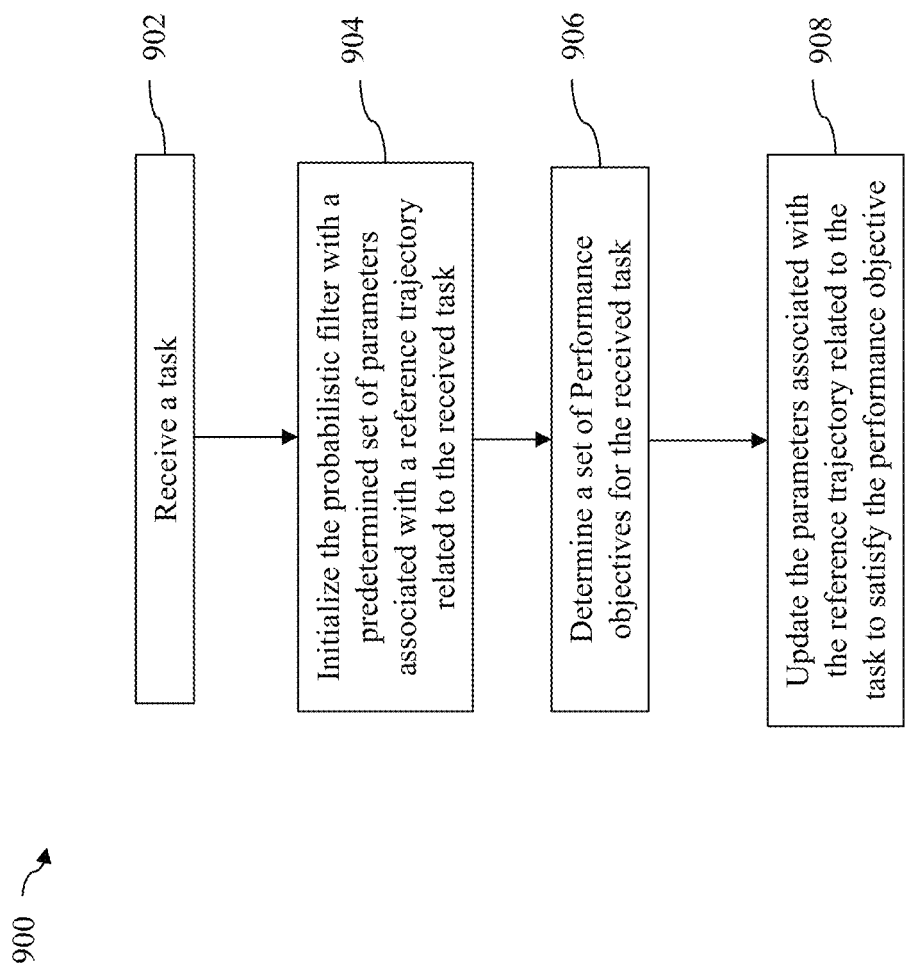
FIG. 9 illustrates a block diagram of a method for updating the parameters associated with a reference trajectory related to a task, according to some embodiments of the present disclosure.

FIG. 9 illustrates a block diagram of a method 900 for updating the parameters associated with a reference trajectory related to a task. The method 900 includes receiving 902 a task to be performed by the legged robot 110 and initializing 904 the probabilistic filter with a predetermined set of parameters associated with a reference trajectory related to the received task. This has already been discussed in conjunction with FIG. 4, FIG. 5 and FIG. 7 above.

Figure 3:
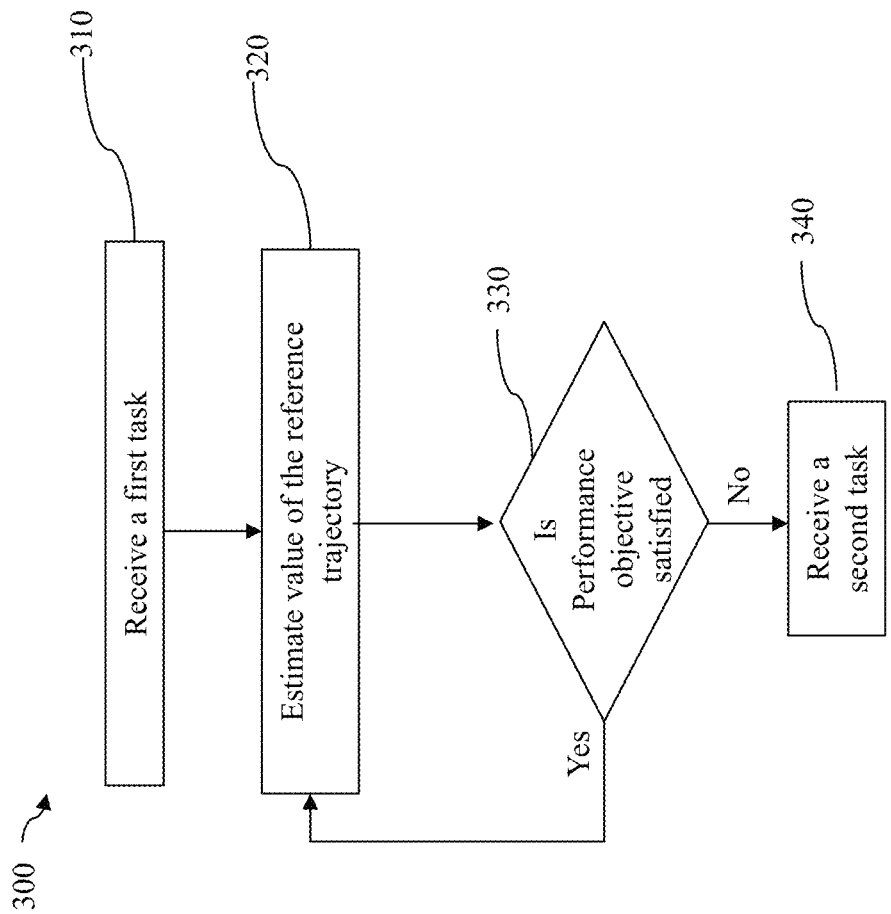
FIG. 3 illustrates a flow chart for estimating a reference trajectory for the legged robot according to some embodiments of the present disclosure.

The method 900 further includes determining 906 a set of performance objectives, such as the performance objective 630, for the received task and updating 908 the parameters associated with the reference trajectory related to the task to satisfy the performance objective 630. For example, as defined previously in conjunction with FIG. 3, the performance objective 630 may include one or a combination of requirements for (i) a desired foot clearance/step height of the legged robot, (ii) a desired walking speed of the legged robot, (iii) a desired turn rate of the legged robot, (iv) a desired stair height for climbing stairs, (v) a desired energy consumption of the legged robot, (vi) a desired foot slippage of the legged robot, and (vii) a desired ground reaction force of the legs of the legged robot. The satisfaction of the performance objective 630 is observed by tracking the state of the reference trajectory being followed by legged robot 110, as shown in FIG. 10.

FIG. 10 illustrates tracking the state of the reference trajectory, according to some embodiments of the present disclosure. In one example, the legged robot 110 may be required to walk at a certain desired walking speed 1010 given by the performance objective 630. However, due to the impact of the environment or noise, there may be a difference between the actual achieved walking speed 1020 by the legged robot 110 and the state 1030 in the reference trajectory generator 160 representing the walking speed. In this example, the tracking of the performance objective 630 enables the legged robot 110 to walk at the desired walking speed 1010 by adjusting the state 1030 in the reference trajectory generator 160. In this scenario, the state 1030 of the reference trajectory generator 160 is a means to achieve the desired walking speed 1010 of the legged robot 110. Hence, the state of the reference trajectory generator 160 tracks certain requirements provided by the performance objective 630.

Some embodiments use a parametrization of the reference trajectory for the legged robot's CoM and the reference trajectories for the legs, $$\{z_{k,ref}, z_{k+1,ref}, \ldots, z_{k+N,ref}\} = \text{refTrajGen}(z_k, \theta_k), \quad (6)$$

where $\text{refTrajGen}(z_k, \theta_k)$ is a function that takes the current state of the legged robot 110 $z_k$ and parameters $\theta_k$. For example, the parameters $\theta_k$ may include a walking speed of the legged robot 110, a foot clearance of the legs of the legged robot 110, the legged robot's rotation, and the like.

Figure 12:
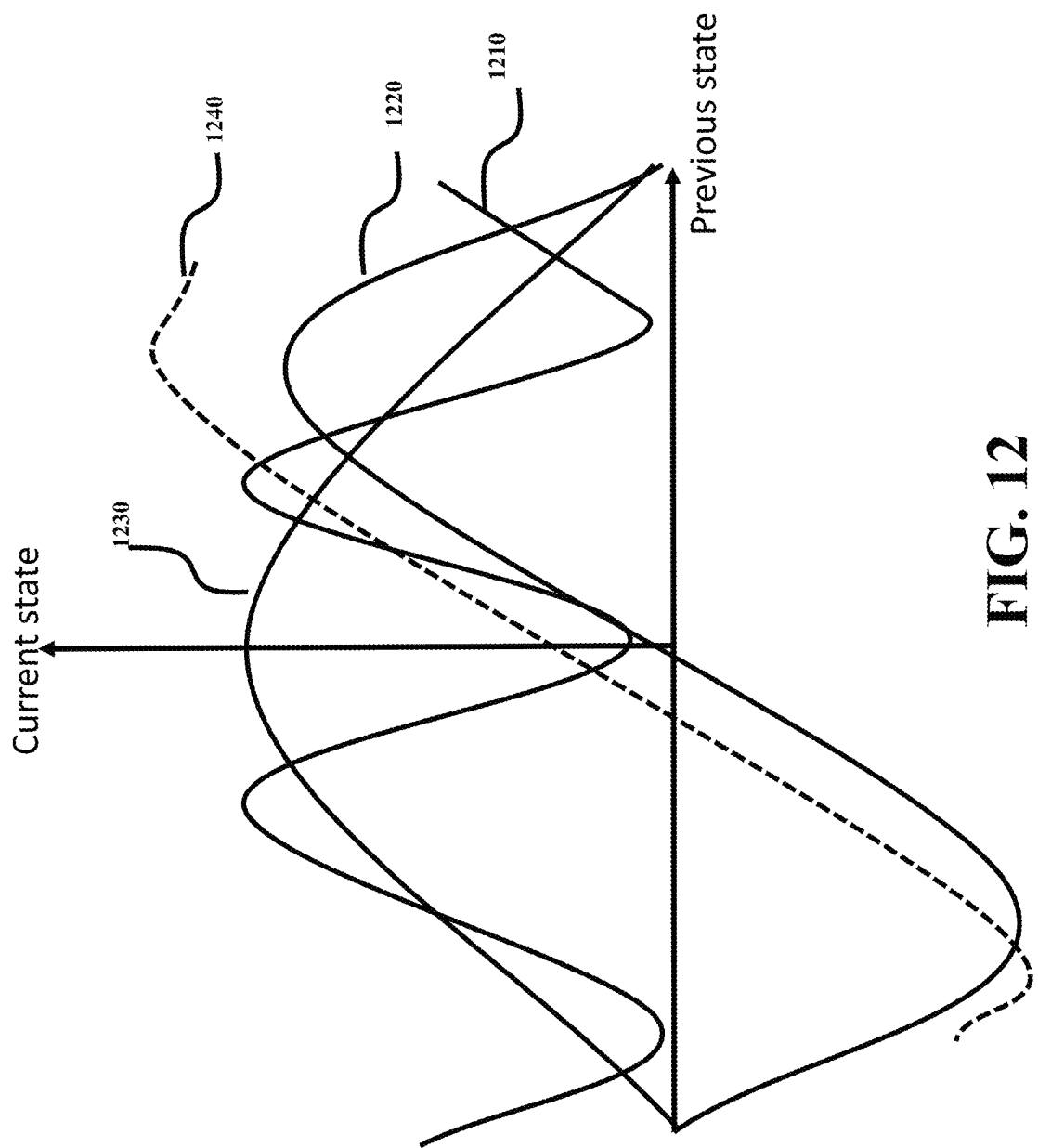
FIG. 12 illustrates an example of the use of weighted function to define a parameter according to some embodiments of the present disclosure.

The reference trajectory may then be computed using the parameters and a set of basis function. For example, there may be the same number of parameters as there are basis functions and the reference trajectory may be computed by multiplying the parameters with the basis functions, $$\{Z_{k,ref}, Z_{k+1,ref}, \ldots, z_{k+N,ref}\} = \sum_{i=1}^{N_{BF}} \theta_i \phi_i(z_k), \quad (7)$$

where $\phi_i$ with $i=1, \ldots N_{BF}$ are the basis functions. Alternatively, there may be more basis functions than there are parameters, and the parameters may be shared among one or multiple basis functions as illustrated in FIG. 12 below.

For example, reference trajectories may consist of a reference trajectory for the center of mass of the robot's base and four reference trajectories for the four feet of the robot. The reference trajectory for the center of mass of the robot's base may be computed with a linear interpolation using the current body position $r_{k-N}^{ref} \in \mathbb{R}^3$, the current body orientation $\Theta_{k-N}^{ref} \in \mathbb{R}^3$, and a desired next body position $r_k^{ref} \in \mathbb{R}^3$ and a desired next body orientation $\Theta_k^{ref} \in \mathbb{R}^3$, $$\begin{bmatrix} r_t^{ref} \\ \theta_t^{ref} \end{bmatrix} = \frac{N-k+t}{N} \begin{bmatrix} r_k^{ref} \\ \theta_k^{ref} \end{bmatrix} + \left(1 - \frac{N-k+t}{N}\right) \begin{bmatrix} r_{k-N}^{ref} \\ \theta_{k-N}^{ref} \end{bmatrix} \quad (8)$$

with $t = k-N, k-N+1, \ldots, k$, which may be computed using a desired velocity of the robot's base $v_{k-N}^{ref} \in \mathbb{R}^3$ and a desired angular velocity of the robot's base $\omega_{k-N}^{ref} \in \mathbb{R}^3$ over a certain phase duration $\Delta T$, $$\begin{bmatrix} r_k^{ref} \\ \theta_k^{ref} \end{bmatrix} = \begin{bmatrix} r_{k-N}^{ref} \\ \theta_{k-N}^{ref} \end{bmatrix} + \begin{bmatrix} v_{k-N}^{ref} \\ \omega_{k-N}^{ref} \end{bmatrix} \Delta T. \quad (9)$$

An advantage of this reference trajectory computation is that it can be easily parametrized, e.g., using the desired angular velocity. The four reference trajectories for the four feet of the robot may be computed using four current foot positions $p_{i,k-N}^{ref} \in \mathbb{R}^3$ with i=1, 2, 3, 4 and four desired foot velocities $v_{i,k-N}^{ref} \in \mathbb{R}^3$ in order to compute four desired next foot positions $p_{i,k}^{ref} \in \mathbb{R}^3$, $$p_{i,k}^{ref} = p_{i,k-N}^{ref} + v_{i,k-N}^{ref} \Delta T. \tag{10}$$

The four desired foot velocities $v_{i,k-N}^{ref}$ may be given by the desired velocity of the robot's base $v_{k-N}^{ref}$. The four reference trajectories for the four feet of the robot may result from a set of basis function such as a cycloidal swing motion, an ellipsoidal swing motion, a triangular swing motion, or the like. For example, for the cycloidal swing motion, the four reference trajectories for the four feet of the robot may be computed by fitting a cycloid with a certain apex height $p_{max}^z \in \mathbb{R}$ to the four current foot positions $p_{i,k-N}^{ref}$ and the four desired next foot positions $p_{i,k}^{ref}$, $$p_{i,t}^{x,ref} = p_{i,k-N}^{x,ref} + \left(p_{i,k}^{x,ref} - p_{i,jk-N}^{x,ref}\right)\frac{s(t) - \sin(s(t))}{2\pi} \tag{11}$$

$$p_{i,jt}^{y,Jref} = p_{i,k-N}^{y,ref} + \left(p_{i,k}^{y,ref} - p_{k-N}^{y,ref}\right)\frac{s(t) - \sin(s(t))}{2\pi}$$

$$p_{i,t}^{z,ref} = \begin{cases} p_{i,k-N}^{z,ref} + p_{max}^z \dfrac{1 - \cos(s(t))}{2} & \text{if } s(t) \le \pi \\ p_{i,jk}^{z,Jref} + \left(p_{max}^z + p_{i,k-N}^{z,ref} - p_{i,k}^{z,ref}\right)\dfrac{1 - \cos(s(t))}{2} & \text{else} \end{cases}$$

with $s(T) = 2\pi \dfrac{N-k+t}{N}$ and $t = k - N$, $k - N + 1, \ldots, k$ and $i = 1, 2, 3, 4$.

Some embodiments are based on parametrizing the reference trajectory calculation. For example, the parameters may include the apex height $p_{max}^z$ and the desired velocity of the robot's base $v_{k-N}^{ref}$. However, changing the apex height $p_{max}^z$ and the desired velocity of the robot's base $v_{k-N}^{ref}$ may also impact other requirements of the robot's motion such as energy consumption or foot slippage. Indeed, if the apex height $p_{max}^z$ is increased, the energy consumption of the electric motors may increase as the electric motors may need to exert more torque. Furthermore, if the desired velocity of the robot's base $v_{k-N}^{ref}$ is increased, the foot slippage may occur because the robot's feet may push forward too aggressively.

Figure 11:
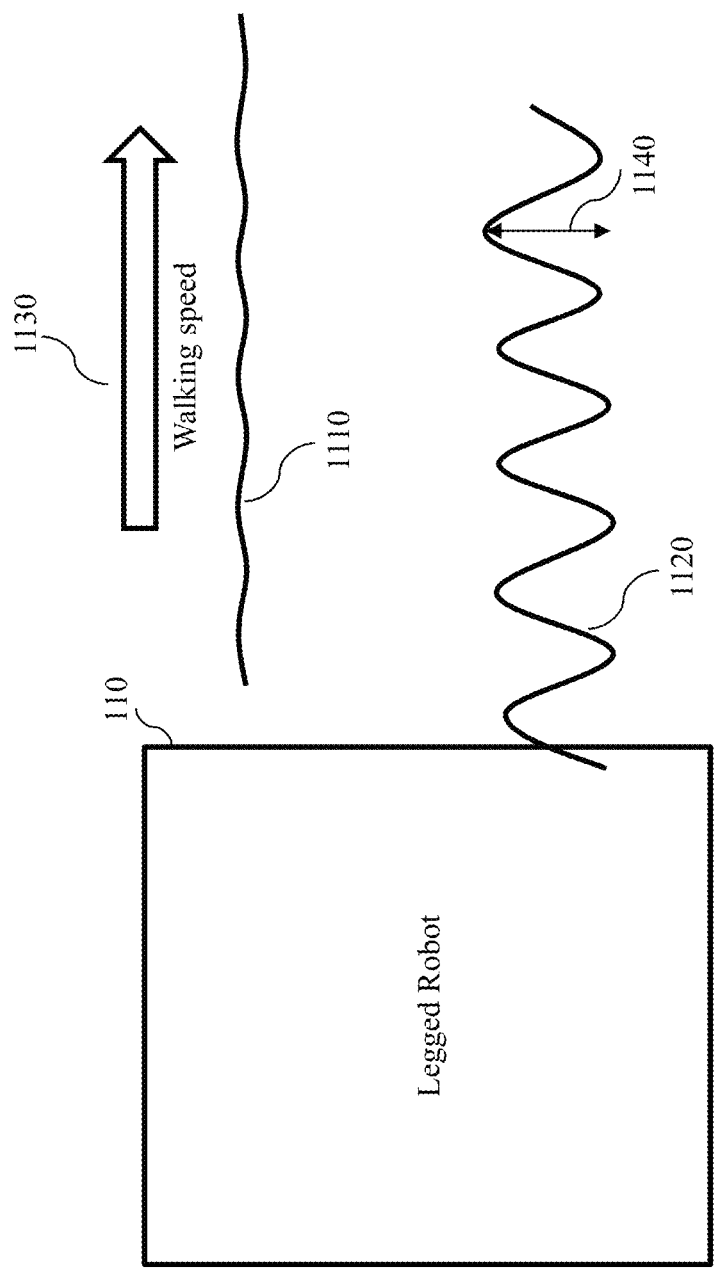
FIG. 11 illustrates parametrization of reference trajectories for a legged robot, according to some embodiments of the present disclosure.

FIG. 11 illustrates parametrization of reference trajectories for a legged robot, according to some embodiments of the present disclosure. The parametrization of the reference trajectory includes parameterizing the legged robot's CoM and the reference trajectories for the legs. In this illustrative example, the reference trajectory for the legged robot's CoM 1110 and the reference trajectories for the legs 1120 may be parametrized using a walking speed 1130 of the legged robot 110 and/or a foot clearance 1140 of the legged robot 110.

FIG. 12 illustrates an example of the use of weighted basis function to define a parameter according to an embodiment. In the illustration there are three basis functions: a basis function 1210, a basis function 1220, and a basis function 1230. Also shown is a true function of a parameter 1240 that together with a motion model maps a previous state to a current state. By combining the basis functions and using different weights for each basis functions, they can be combined to reproduce the true function of the parameter, hence the true motion model.

FIG. 13 illustrates a table 1300 representing the encoding/decoding of parameters 1301 associated with a reference trajectory related to a task using basis function. The table illustrates type of basis function 1302 and an example of the basis function 1303 for each parameter. Examples of few parameters include walking speed 1301a, foot clearance/step height 1301b, turn rate 1301c, stair height 1301d, etc. The task may include basis functions for the center of mass 1302a and basis functions for the feet 1302b. For example, for the walking speed 1301a, the reference trajectory for the center of mass may be computed by using the basis function for the center of mass 1302a, which may be linear or constant basis function 1303a or a combination thereof. For example, a reference position for the center of mass can be computed by extrapolating the walking speed 1301a parameter in combination with a linear basis function, $$p_{k+t}^{ref,CoM} = p_k^{CoM} + \theta_{walking} t \tag{12}$$

The task may be to achieve a certain foot clearance 1301b. For example, the task may use basis functions for the feet 1302b, which may be given by cycloidal basis function 1303b. In this example, the reference trajectory for the feet is given by an initial position of the foot, a touchdown position for the foot, and the cycloidal basis function connecting the initial position and the touchdown position thereby achieving the foot clearance. Thus, a cycloidal basis function with variable touchdown height 1303c may be used. Alternatively, the task may be to climb a stair. In this example, the touchdown position of the foot may be changed to account for the height of the stairs.

The parameters and basis functions illustrated in the table 1300 are for example purpose only and need not be construed to be limiting the scope of this disclosure in any way.

Figure 2:
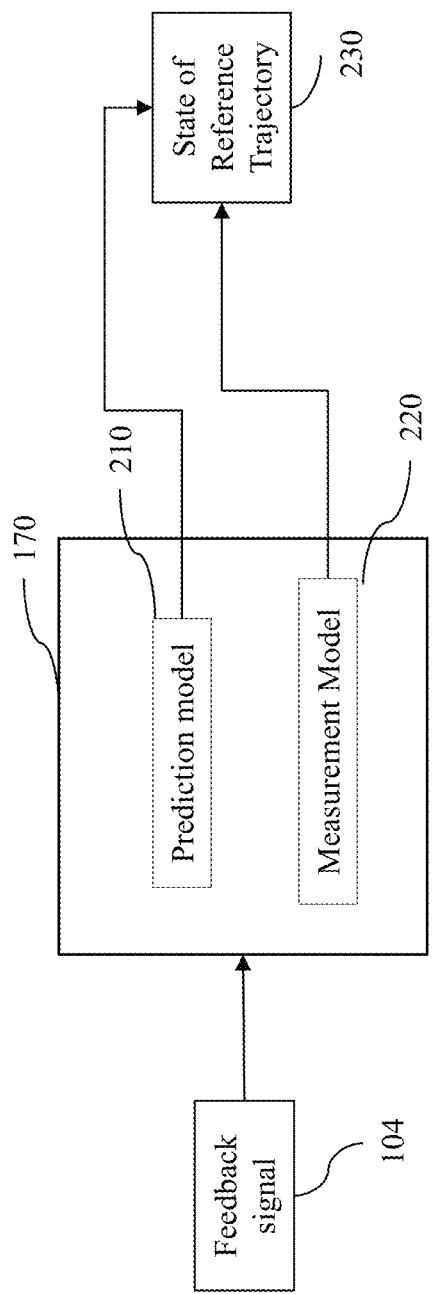
FIG. 2 illustrates a probabilistic filter predicting a state of a reference trajectory for the legged robot according to some embodiments of the present disclosure.
Figure 14:
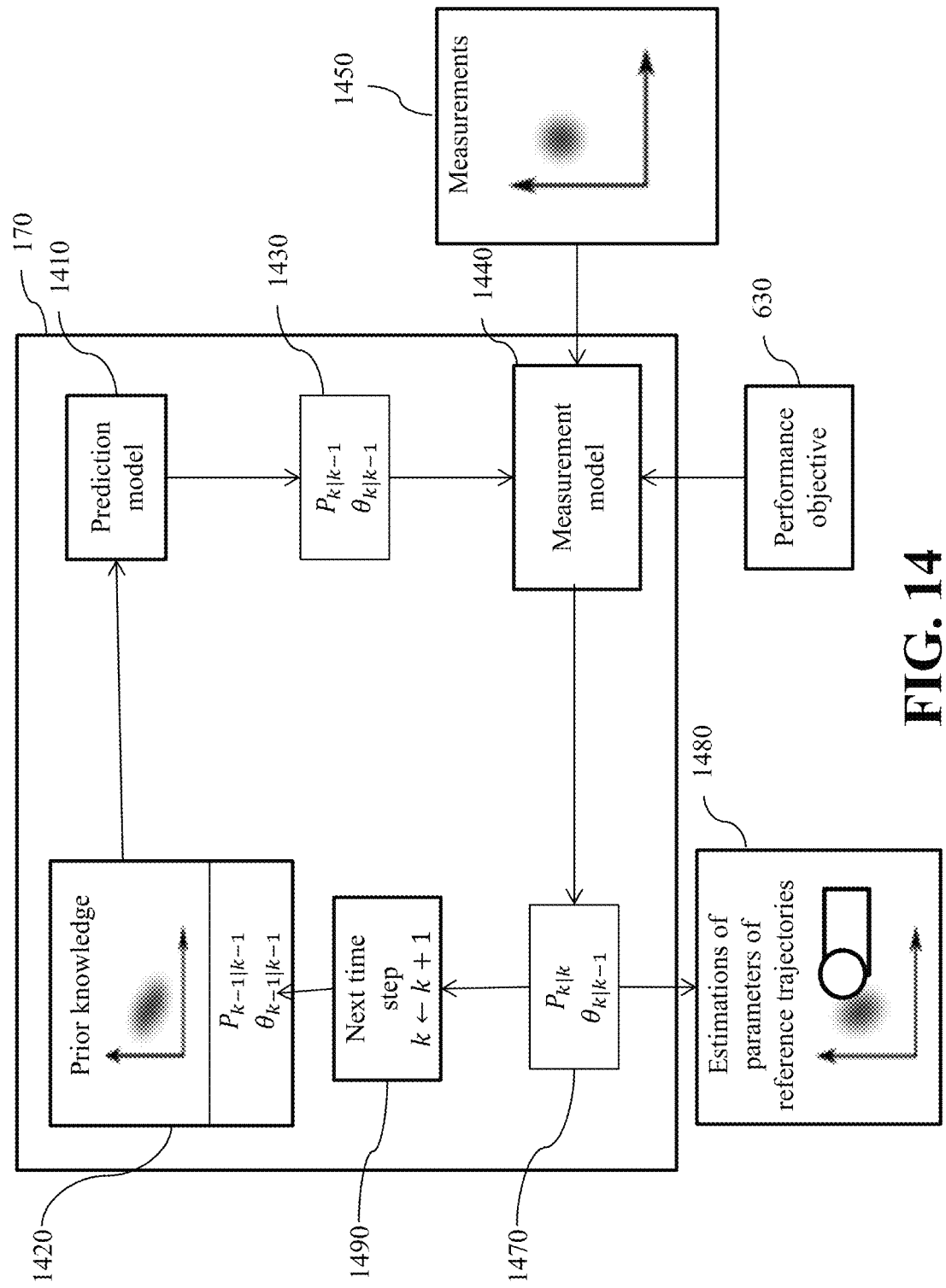
FIG. 14 illustrates a Kalman filter for producing parameters of reference trajectories, according to some embodiments of the present disclosure.

FIG. 14 illustrates the probabilistic filter 170, for example the Kalman filter for producing the parameters of the reference trajectories, according to some embodiments of the present disclosure. Hereinafter, for the purpose of description of FIG. 14, the probabilistic filter 170 would be interchangeably referred to as the Kalman filter 170, without deviating from the scope of the present disclosure. According to an embodiment, the state of the Kalman filter 170 is defined by the parameters of the reference trajectories. To this end, it is an objective of the Kalman filter 170 to iteratively produce the parameters of the reference trajectories. In an example embodiment, the Kalman filter 170 may iteratively produce the parameters of the reference trajectories, using a prediction model 1410 and a measurement model 1440. The prediction model 1410 is equivalent to the prediction model 210 shown in FIG. 2, and the measurement model 1440 is equivalent to the measurement model 220 shown in FIG. 2, without limiting the scope of the present disclosure. For instance, the prediction model 1410 and the measurement model 1440 may be artificially designed.

To produce the parameters of the reference trajectories in a current iteration (e.g., at a time step k), the prediction model 1410 may be configured to predict values of the parameters of the reference trajectories using a prior knowledge 1420 of the parameters of the reference trajectories. For instance, the prior knowledge 1420 of the parameters of the reference trajectories may be produced at a pervious iteration (e.g., at a time step k−1). The prior knowledge 1420 of the parameters of the reference trajectories may be a joint probability distribution (or a Gaussian distribution) over the parameters of the reference trajectories at the pervious iteration. The joint probability distribution over the parameters of the reference trajectories at the pervious iteration can be defined by a mean, $\theta_{k-1|k-1}$, and a variance (or a covariance), $P_{k-1|k-1}$, computed at the previous iteration. For instance, the joint probability distribution at the previous iteration may be produced based on a joint probability distribution that was produced in a past previous iteration (e.g. at time step k−2).

According to an embodiment, the values of the parameters of the reference trajectories predicted in the current iteration may also be a joint probability distribution 1430 (or a Gaussian distribution 1430). For instance, the output of the prediction model 1410 may be the joint probability distribution 1430, when the prediction model 1410 is configured to predict multiple parameters of the reference trajectories. Alternatively, the output of the prediction model 1410 may be the Gaussian distribution 1430 when the prediction model 1410 is configured to predict a single parameter of the reference trajectories. For instance, the joint probability distribution 1430 may be defined by a mean, $\theta_{k|k-1}$, and a variance (or a covariance) $P_{k|k-1}$, computed in the current iteration. For example, while predicting the single parameter of the reference trajectories, the Gaussian distribution outputted by the prediction model 1410 is as shown in FIG. 15.

Figure 15:
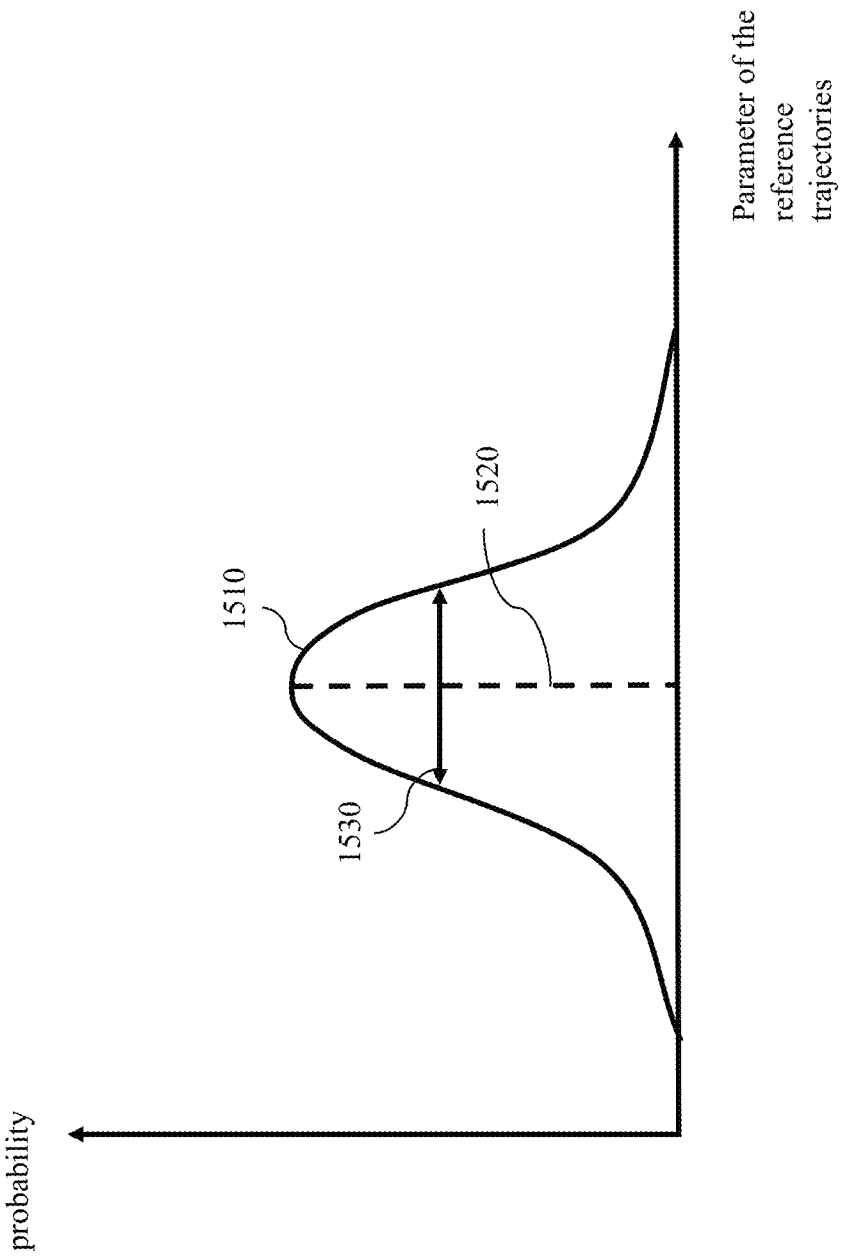
FIG. 15 illustrates a Gaussian distribution representing a parameter of reference trajectories, according to some embodiments of the present disclosure.

FIG. 15 illustrates a Gaussian distribution 1510 representing a parameter of reference trajectories, according to some embodiments of the present disclosure. FIG. 15 is explained in conjunction with FIG. 14. The Gaussian distribution 1510 may be predicted by the prediction model 1410. For instance, the Gaussian distribution 1510 may correspond to the Gaussian distribution 1430. The Gaussian distribution 1510 may be defined by a mean 1520 (e.g. the mean, $\theta_{k|k-1}$) and a variance 1530 (e.g. the variance $P_{k|k-1}$), where the mean 1520 defines a center position of the Gaussian distribution 1510 and the variance 1530 defines a measurement of a spread (or a width) of the Gaussian distribution 1510.

Referring to FIG. 14, according to an embodiment, the prediction model 1410 may be subjected to a process noise. As used herein, the process noise may be an assumption that defines how quickly the parameters of the reference trajectories change over a time. The process noise may control how quickly the parameters of the reference trajectories change over the time within a variance defined by the process noise. The process noise may be artificially designed. For example, for different process noise assumptions, the prediction model 1410 may output different Gaussian distributions for one particular parameter of the reference trajectories, where the different Gaussian distributions may have different variances. For instance, the different Gaussian distributions outputted by the prediction model 1410 for one particular parameter of the reference trajectories is as shown in FIG. 16.

Figure 16:
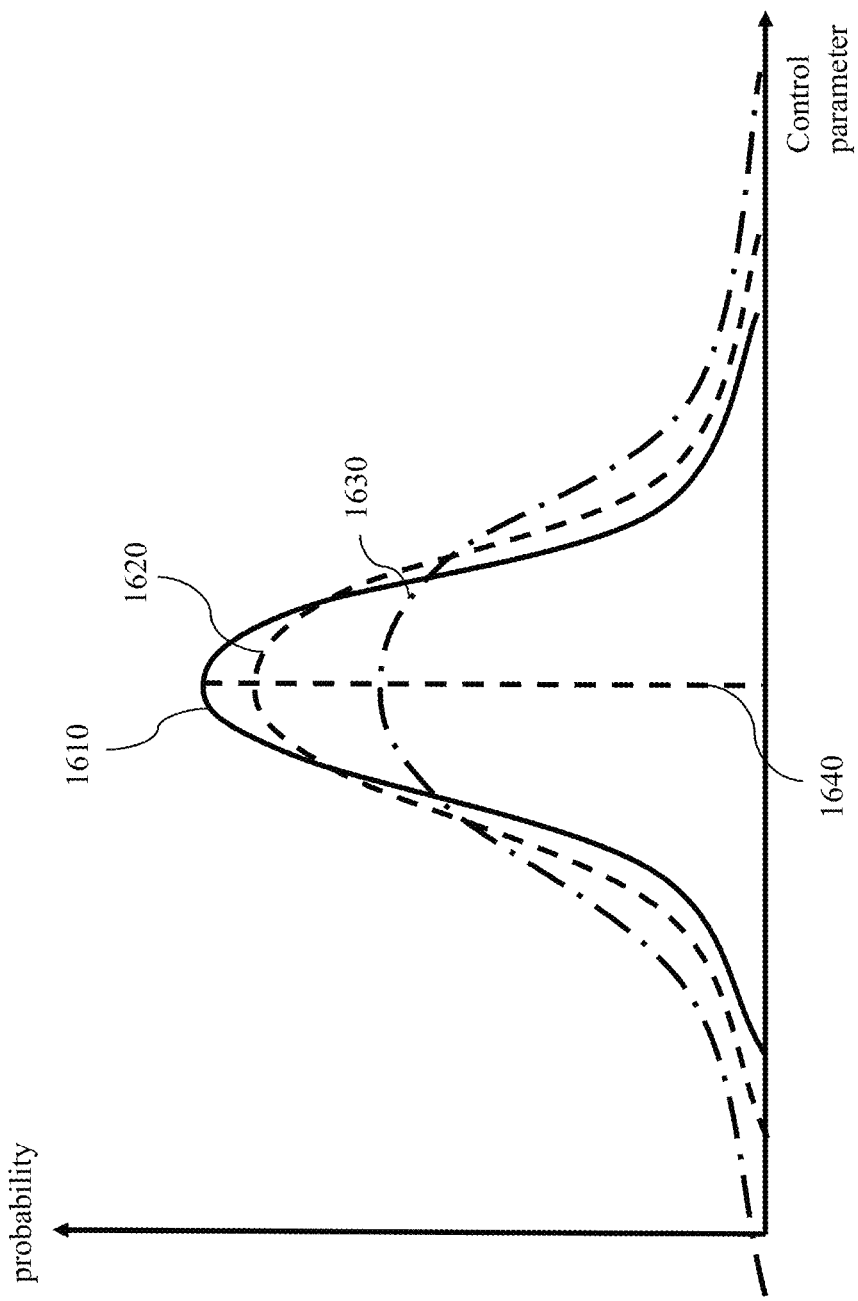
FIG. 16 illustrates Gaussian distributions with different variances, according to some embodiments of the present disclosure.

FIG. 16 illustrates Gaussian distributions 1610, 1620, and 1630 with different variances, according to some embodiments of the present disclosure. FIG. 16 is explained in conjunction with FIG. 14. The Gaussian distributions 1610, 1620, and 1630 may be predicted by the prediction model 1410. Each of these Gaussian distributions 1610, 1620, and 1630 may have a different variance with respect to each other, but a mean 1640 of the Gaussian distributions 1610, 1620, and 1630 may be the same. A Gaussian distribution with a small variance and the mean 1640 having a highest probability among other Gaussian distributions may be more certain about the correct parameter of the reference trajectories.

Referring to FIG. 14, the prediction model 1410 subject to the process noise may be configured to predict the values of the parameters of the reference trajectories that are outputted as the joint probability distribution 1430 (or the Gaussian distribution 1430). Once the joint probability distribution 1430 is outputted by the prediction model 1410 in the current iteration, the measurement model 1440 may be configured to update, based on a sequence of measurements 1450, the predicted values of the parameters of the reference trajectories to produce the current values of the parameters of the reference trajectories. In an example embodiment, the sequence of measurements 1450 may be the sequence of measurements received by the transceiver 130.

Figure 17:
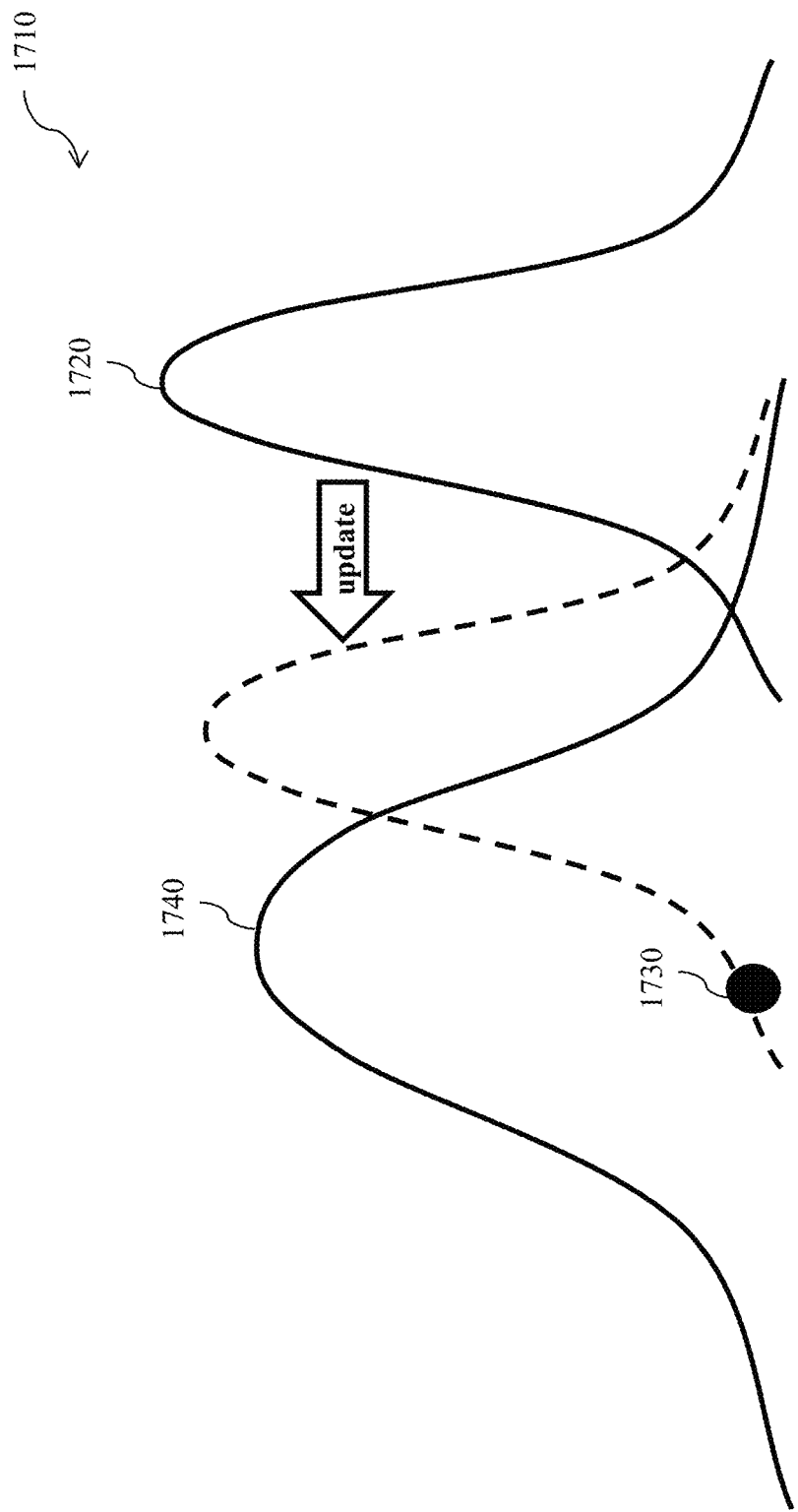
FIG. 17 illustrates a schematic for updating predicted values of parameters of reference trajectories, according to some embodiments of the present disclosure.

FIG. 17 illustrates a schematic 1710 for updating the predicted values of the parameters of the reference trajectories, according to some embodiments of the present disclosure. FIG. 17 is explained in conjunction with FIG. 14. The schematic 1710 includes a predicted Gaussian distribution 1720, a parameter of the reference trajectories 1730, an updated Gaussian distribution 1740. For instance, the predicted Gaussian distribution 1720 may be the Gaussian distribution 1430 defined by the mean, $\theta_{k|k-1}$, and the variance, $P_{k|k-1}$. For instance, the parameter of the reference trajectories 1730 may be a parameter of the reference trajectories that can be used to control the legged robot 110 in order to achieve the specific reference trajectory, with respect to a performance objective 630.

The performance objective 630 may include requirements for the operation of the legged robot 110 such as walking at a certain walking speed, turning at a certain rate, achieving a certain foot clearance, and the like. The requirements for the operation of the legged robot 110 may be used to adjust the parameters of the reference trajectories such as foot clearance 1140 or the walking speed 1030 as discussed above in FIG. 11.

Further, the parameter of the reference trajectories 1730 may be originated from the predicted Gaussian distribution 1720, for which a measurement is close to zero probability with the predicted Gaussian distribution 1720. To this end, the measurement model 1440 may update the predicted Gaussian distribution 1720 such that the predicted Gaussian distribution 1720 moves closer to the updated Gaussian distribution 1740. In other words, the measurement model 1440 may update the mean and the variance associated with the predicted Gaussian distribution 1720 to a mean (e.g. a mean $\theta_{k|k}$) and a variance (e.g. a variance $P_{k|k}$) corresponding to updated Gaussian distribution 1740.

Referring back to FIG. 14, the measurement model 1440 may update, based on the sequence of measurements 1450, the predicted values of the parameters of the reference trajectories to produce the current values of the parameters of the reference trajectories according to the performance objective 630. According to an embodiment, the measurement model 1440 may output the produced current values of the parameters of the reference trajectories as a joint probability distribution 1480 (or a Gaussian distribution 1480), which are defined the quantities 1470, for example, the mean, $\theta_{k|k}$, and the variance, $P_{k|k}$. The Kalman filter 170 may repeat the procedure to produce the parameters of the reference trajectories in a next iteration 1490 (e.g., at a time step k+1), that is iteratively.

In some embodiments, the Kalman filter 170 collectively adjusts the parameters of the reference trajectories, because the requirements in the performance objective 630 and the parameters of the reference trajectories are interdependent on each other. One advantage of using the Kalman filter 170 is that the interdependence of the parameters of the reference trajectory is considered by means of the joint probability distribution 1480.

Some embodiments are based on adapting the pre-computed reference trajectories to the current environment or the current task. For example, the pre-defined reference trajectories may include a reference trajectory for a left turn, a reference trajectory for a right turn, a reference trajectory for walking at a certain average speed, a reference trajectory for trotting at a certain average speed, and the like. While the memory may be able to store a selection of reference trajectories, the tasks that the robot has to execute may be more complex to be covered by a fixed number of the pre-computed reference trajectories. The advantages of the present disclosure include that not all possible tasks and reference trajectories need to be stored in the memory. Instead, only the pre-computed reference trajectories need to be stored along with the method and system to adapt the pre-computed reference trajectories to match the current task and/or the current environment.

Figure 18:
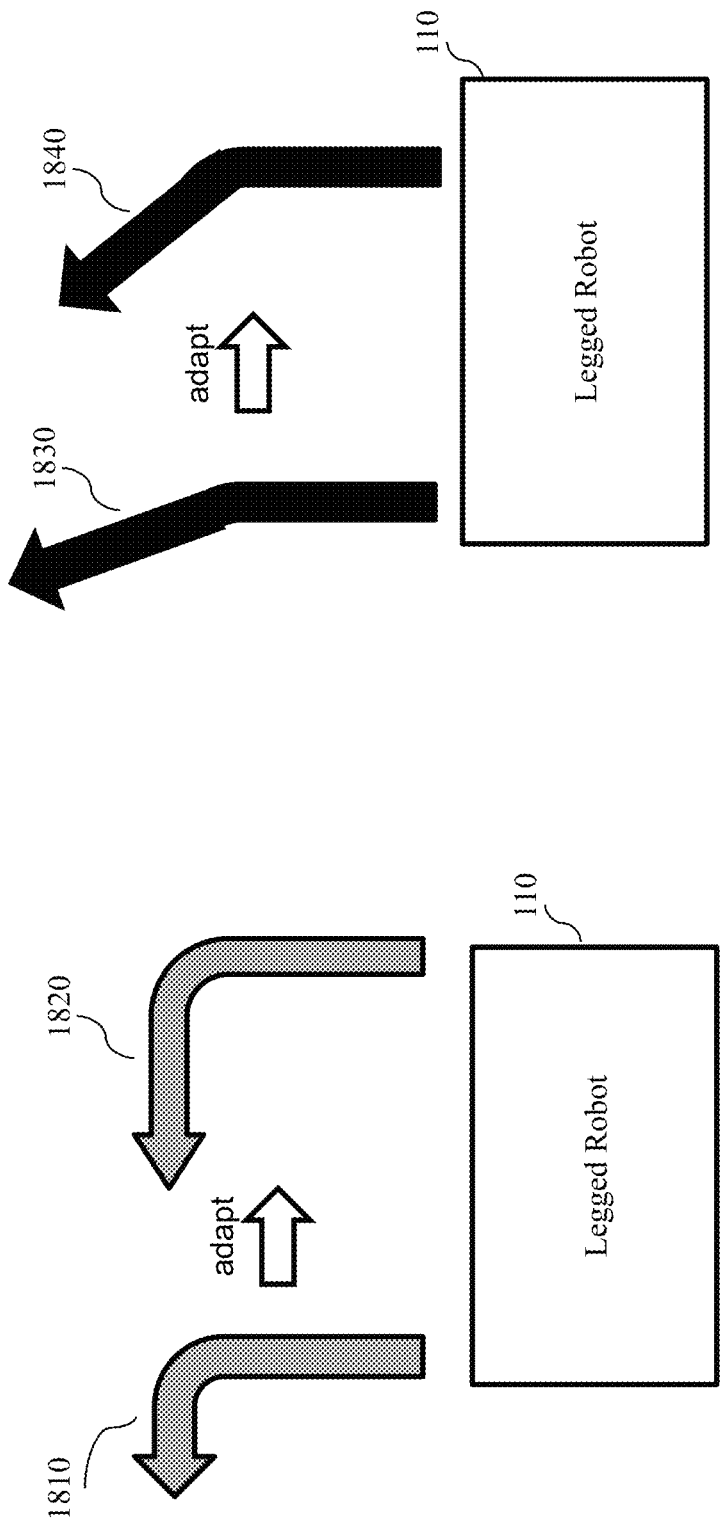
FIG. 18 illustrates examples of adapting pre-computed reference trajectories, according to some embodiments of the present disclosure.

FIG. 18 illustrates examples of adapting pre-computed reference trajectories, according to some embodiments of the present disclosure. In one example, while the legged robot 110 may need to take a 90-degree left turn at a velocity of 1.3 m/s 1820, there may only be a pre-defined reference trajectory of a 90-degree left turn at a velocity of 1 m/s 1810. Hence, some embodiments use the pre-defined reference trajectory with the 90-degree left turn at a velocity of 1 m/s 1810 and an algorithm to adapt the pre-defined reference trajectory 1810 to meet the requirements of 90-degree left turn with a velocity of 1.3 m/s 1820. In another example, the legged robot 110 may need to take a 40-degree left turn at a velocity of 1.3 m/s 1840, but there may only be a pre-defined reference trajectory 1830 of a 20-degree left turn at a velocity of 1.3 m/s. Some embodiments use the pre-defined reference trajectory with the 90-degree left turn at a velocity of 1 m/s 1830 and the algorithm to adapt the pre-defined reference trajectory 1830 to meet the requirements of 40-degree left turn with a velocity of 1.3 m/s 1840.

Some embodiments use the performance objective for adapting the parameters of the reference trajectories. The performance objective for adapting the pre-computed reference trajectories may include the velocity of the legged robot 110, the foot clearance of the legged robot 110, the turn radius of the legged robot 110, and the like. Some embodiments use a quadratic norm for the performance objective with $$\text{reqFun} = (\Delta \text{req}(z_{k-N}, \ldots, z_{k-1}, z_k))^T C_{req}^{-1} (\Delta \text{req}(z_{k-N}, \ldots, z_{k-1}, z_k)), \quad (13)$$

with $$\Delta \text{req}(z_{k-N}, \ldots, z_{k-1}, z_k) = \text{req}_{target,k} - \text{req}(z_{k-N}, \ldots, z_{k-1}, z_k), \quad (14)$$

where $\text{req}_{target}$ denotes target values of the requirements, and $\text{req}(z_{k-N}, \ldots, z_{k-1}, z_k)$ is the function mapping the states $z_k$ from time k–N to time k to the achieved value of the performance objective. For example, for completing a 70-degree left turn with a velocity of 1.3 m/s, the target values of the requirements may be $$\text{req}_{target,k} = \begin{bmatrix} 1.3 \\ 70 \end{bmatrix}, \quad (15)$$

and the function mapping the states $z_k$ from time k–N to time k to the achieved value of the specification function may be $$\text{req}(z_{k-N}, \ldots, z_{k-1} z_k) = \begin{bmatrix} \frac{1}{N+1} \sum_{i=k-N}^{k} v_{x,i} \\ \sum_{i=k-N}^{k} \dot{\omega}_{y,i} T_s \end{bmatrix}, \quad (16)$$

where $v_{x,i}$ is the longitudinal walking speed of the robot, $\dot{\omega}_{y,i}$ is the yaw rate of the robot, and $T_s$ is the sampling period of the controller or the sensing system.

Some embodiments use the performance objective (13) in order to select a pre-computed reference trajectory that is closest in some norm to the requirement target values $\text{req}_{target,k}$. The requirement target value may be compared with the pre-computed reference trajectories in the database of reference trajectories 420. The pre-computed reference trajectories in the database of reference trajectories 420 may have requirement values associated, which may be used to compare the pre-computed reference trajectories with the requirement target value and determine which pre-computed reference trajectory fits the current task and its requirement target value most closely. For example, a squared 2-norm may be computed between the requirement target value and the associated requirement value of the pre-computed reference trajectories in the database of reference trajectories 420. Then, the pre-computed reference trajectory may be chosen that yields the smallest squared 2-norm. For example, given a number of the pre-computed reference trajectories $\text{req}_{store}^i$ with i=1, ..., $N_{store}$, the pre-computed reference trajectory that yields the lowest cost $\text{cost}^i$ may be selected, $$\text{cost}^i = (\text{req}_{target,k} - \text{req}_{store}^i)^T Q (\text{req}_{target,k} - \text{req}_{store}^i), \quad (17)$$

which uses a selection weighting matrix Q. For example, if the target velocity of the legged robot 110 is 1.3 m/s and the target foot clearance of the legged robot 110 10 cm, $$\text{req}_{target,k} = \begin{bmatrix} 1.3 \\ 10 \end{bmatrix}, \quad (18)$$

and there are three pre-computed reference trajectories with $$\text{req}_{store}^1 = \begin{bmatrix} 1.0 \\ 10 \end{bmatrix}, \text{req}_{store}^2 = \begin{bmatrix} 1.25 \\ 10 \end{bmatrix}, \text{req}_{store}^3 = \begin{bmatrix} 1.5 \\ 15 \end{bmatrix}, \quad (19)$$

then, using the selection weighting matrix $$Q = \begin{bmatrix} 1 & 0 \\ n & 1 \end{bmatrix}, \quad (20)$$

the pre-computed reference trajectory associated with $\text{req}_{store}^2$ may be selected as it is closest in norm. The parameters of the chosen pre-computed reference trajectory may then be used and further adapted to satisfy the task and the requirement target values. For example, the parameters of the pre-computed reference trajectory associated with $\text{req}_{store}^2$ may be used to initialize the Kalman filter 170.

Some embodiments continuously compare the adapted reference trajectory that is currently utilized by the controller with the requirement value of the pre-computed reference trajectories in the database of reference trajectories 420. For example, the squared 2-norm may be computed between the requirement target value and the adapted reference trajectory currently employed in the controller. Further, the squared 2-norm may be computed between the requirement target value and the pre-computed reference trajectories in the database of reference trajectories 420. The adapted reference trajectory may be replaced by another per-computed reference trajectory if the squared 2-norm may be lower. One advantage of the continuously comparing of the adapted reference trajectory with the pre-computed reference trajectories is that if the requirement target value shifts, it may be more efficient to switch the reference trajectory and re-initialize the tracking algorithm with the new set of parameters associated with the newly selected pre-computed reference trajectory.

Some embodiments adapt the parameters of the reference trajectory to fulfill the requirements of a certain task or a certain environment. The parameters of the reference trajectory may be adapted after every step of the robot with $$\theta_k = \theta_{k-N} + \Delta\theta_k, \quad (21)$$

where N is the time to take one step, $\theta_{k-N}$ are the parameters of the reference trajectory at time step k−N, $\theta_k$ are the parameters of the reference trajectory at time step k, and $\Delta\theta_k$ is a parameter update at time step k. The parameters of the reference trajectory may be predicted to not change between time steps (21), which may be useful when the legged robot 110 is executing a continuation task in which the specifications in the performance objective 630 do not change. Alternatively, the parameters of the reference trajectory may be predicted to change between time steps, $$\theta_k = g(\theta_{k-N}) + \Delta\theta_k, \quad (22)$$

which may be useful when the specifications in the performance objective 630 change between time steps.

Some embodiments are based on the recognition that the prediction model of the parameters of the reference trajectory is part of a virtual system that can be freely defined. For example, if the legged robot 110 is required to change its walking speed, then the parameter of the reference trajectory associated with walking speed may be predicted to change according to how quickly the walking speed is supposed to be reduced. In other words, the prediction model anticipates changing specifications and changes the parameter of the reference trajectory.

Some embodiments are based on the recognition that the environment can be considered by the reference trajectory generator. Some embodiments use the state of the reference trajectory with a tracking formulation in order to consider the environmental effects on the control. For example, this may be achieved by the states of the reference trajectory generator tracking the performance objective 630. The tracking may be achieved by using principles of feedback control and/or estimation in order to drive the state of the reference trajectory to satisfy the performance objective 630. For example, the parameter update $\Delta\theta_k$ may be determined using a gradient of the performance objective 630 with respect to the parameters of the reference trajectory or using other principles of feedback control and tracking. Alternatively, the parameter update $\Delta\theta_k$ may be considered to be probabilistic. Furthermore, the performance objective 630 may be considered to be probabilistic. In such an exemplary situation, maximum likelihood estimation may be used in order to determine the parameter update $\Delta\theta_k$. In this example, a probabilistic filter such as the Kalman filter 170 may be used to determine the parameter update $\Delta\theta_k$.

Some embodiments use a recursive implementation with the Kalman filter 170 illustrated in FIG. 14 in order to compute the parameter update $\Delta\theta_k$. The prior knowledge 1420 of the parameters of the reference trajectories may be chosen in order to control how quickly the parameters of the reference trajectory $\theta_k$ change over time, $$\theta_k^{prior} \sim N(\theta_{k-N}, C_\theta) \quad (23)$$

or $$\theta_k^{prior} \sim N(g(\theta_{k-N}), C_\theta). \quad (24)$$

For the Kalman filter 170 implementation, an Unscented Kalman filter (UKF) may be used and the performance objective 630 in (13) is interpreted as having a prior distribution, $$req_{target,k} \sim N(req(z_{k-N}, \ldots, z_{k-1}, z_k), C_{req}). \quad (25)$$

The parameters of the reference trajectory may then be computed using the posterior distribution as $$\Delta\theta_k = K_k(req_{target,k} - \widehat{req}_k), \quad (26)$$

with the Kalman gain $K_k$ computed as $$\hat{\theta}_k \Sigma_{j=0}^{2L} v_j^a \theta_k^{sp,j}$$

$$\widehat{req}_k = \Sigma_{j=0}^{2L} v_j^a req_k^{sp,j}$$

$$req_k^{sp,j} = h(\theta_k^{sp,j})$$

$$S_k = C_{req} + \Sigma_{j=0}^{2L} v_j^c (req_k^{sp,j} - \widehat{req}_k)(req_k^{sp,j} - \widehat{req}_k)^T.$$

$$Z_k = \Sigma_{j=0}^{2L} v_j^c (\theta_k^{sp,j} - \hat{\theta}_k)(req_k^{sp,j} - \widehat{req}_k)^T$$

$$K_k = Z_k S_k^{-1} \quad (27)$$

The posterior distribution may be computed using sigma points $\theta_k^{sp,j}$, computed as $$P_{k|k-N} = C_\theta + \Sigma_{j=0}^{2L} v_j^c (\theta_k^{sp,j} - \hat{\theta}_k)(\theta_k^{sp,j} - \hat{\theta}_k)^T,$$

$$P_{k|k} = P_{k|k-N} - K_k S_k K_k^T \quad (28)$$

where $\theta_k^{sp,j}$ is the jth sigma point, $v_j^c$ and $v_j^a$ denote weights associated with the sigma points, $Z_k$ is the cross-covariance matrix, $S_k$ is the innovation covariance, and $P_{k|k}$ is the estimate covariance. For each of the sigma points $\theta_k^{sp,j}$, the motion of the legged robot 110 are simulated using a model of the legged robot 110, $$z_{k+1} = f(z_k, \tau_{1,k}, \tau_{2,k}, \tau_{3,k}, \tau_{4,k}) + w_k, \quad (29)$$

where $f(z_k, \tau_{1,k}, \tau_{2,k}, \tau_{3,k}, \tau_{4,k})$ is the model of the legged robot 110, and $w_k$ is a model mismatch between the legged robot 110 and the model of the legged robot 110. The performance of the simulated sigma points is evaluated using the performance objective 630 and denotes as $h(\theta_k^{sp,j})$, where the control inputs to the legged robot 110, $\tau_{1,k}$, $\tau_{2,k}$, $\tau_{3,k}$, $\tau_{4,k}$, are computed using the sigma points and the model of the legged robot (29).

In this Kalman filter implementation, the prior on how the parameters of the reference trajectory change may be interpreted as the prediction model and the prior on the performance objective may be interpreted as a measurement model. The prediction model anticipates changing specifications and changes the parameter of the reference trajectory accordingly. The measurement model uses the evaluations and the sensor measurement to correct the prediction and in order to consider the environment in the generation of the reference trajectories.

The mismatch between the legged robot 110 and the model of the legged robot 110 may be computed using sensor measurements onboard the legged robot 110. The model of the legged robot 110 may be obtained from the kinematics or the dynamics of the legged robot 110. The advantages of considering the mismatch between the legged robot 110 and the model of the legged robot 110 for adapting the parameters of the reference trajectory include a more precise control of the legged robot 110, because inaccuracies may be compensated by the generation of the reference trajectories.

Additionally, using the model of the legged robot 110 offers the advantage of fast convergence of the adaptation algorithm because the inertia of the robot and the physics of the legged robot's motion are used to steer the adaptation to the parameters. Another advantage of the disclosed system and method is that the model of the legged robot may be adjusted to the available computational resources. For example, if computational resources of the legged robot are limited, then a simplified model of the legged robot may be used, which has the advantage of being easily implementable on hardware. As an alternative example, if computational resources of the legged robot are higher, then a high-fidelity model of the legged robot may be used, which has the advantage of being more accurate and may enable faster convergence.

In other words, the Kalman filter 170 uses evaluations of the performance objective 630 of the simulated motion of the legged robot 110 in order to adapt the parameters of the reference trajectory. Advantages of using such evaluations of the sigma points include a fast and safe adaptation of the parameters of the reference trajectory, because of the model of the legged robot. Simulating the motion of the legged robot makes sense, because the sigma points influence the behavior of the legged robot through the reference trajectories.

The sigma points may be generated using the posterior distribution, e.g., using a Choletsky decomposition, $$\theta_k^{sp,0} = \theta_k \tag{30}$$

$$\theta_k^{sp,j} = \theta_k + \sqrt{\frac{L}{1-v_0}} \Gamma_k^j \text{ for } j = 1, \ldots, L$$

$$\theta_k^{sp,j} = \theta_k - \sqrt{\frac{L}{1-v_0}} \Gamma_k^j \text{ for } j = L+1, \ldots, 2L,$$

where $\Gamma_k^j$ is the jth column of $\Gamma$ and $P_{k|k} = \Gamma_k \Gamma_k^T$ meaning that $\Gamma_k$ is calculated using the Choletsky decomposition.

Figure 19:
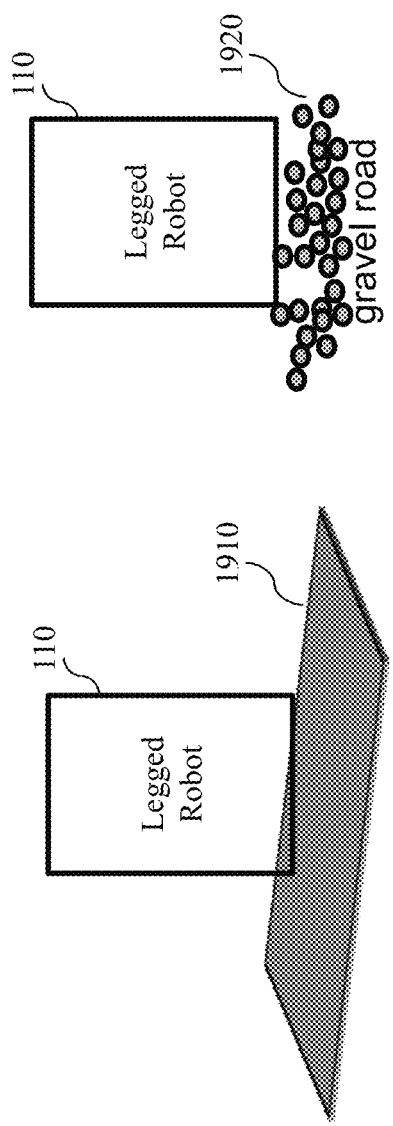
FIG. 19 illustrates the legged robot walking on different terrains, according to some embodiments of the present disclosure.

FIG. 19 illustrates the legged robot 110 walking on different terrains, for example asphalt road or gravel road, according to some embodiments of the present disclosure. The performance objective 630 (13) may be chosen to achieve a certain target velocity, a certain foot clearance, while minimizing an energy consumption and foot slippage. Minimizing the foot slippage in this example may increase the robustness of the legged robot 110. In a scenario, where the legged robot 110 walks on an asphalt road 1910, foot slippage may be low due to the higher friction of the asphalt road 1910. Hence, in this scenario, the legged robot 110 may be able to walk faster, because the legs of the legged robot 110 may have more traction. On the other hand, in a scenario, where the legged robot 110 walks on a gravel road 1920, foot slippage may be higher due to the uneven terrain. Hence, in this scenario, the legged robot 110 may have to walk at a lower velocity to avoid falling, because the legs of the legged robot 110 may have less traction. Then, in these examples, one advantage of the present disclosure is that the method finds the reference trajectories that optimize the trade-off between the requirements. In the scenario, where the legged robot 110 walks on the asphalt road 1910, the friction coefficient is high, and the chances of the foot slippage are lower. Hence, the method makes the legged robot 110 walk at a faster velocity, because the risk of slipping is low. On the other hand, in the scenario, where the legged robot 110 walks on a gravel road 1920, the chances of the foot slippage are higher. Hence, the method automatically makes the robot may walk at a slower velocity, because the risk of slipping is higher. Another advantage of the present disclosure is that transitions between different gaits are smooth due to the recursive and filter-based design, which is important for robustness and stability.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A control system for controlling a legged robot, wherein the control system comprises a processor; and a memory having instructions stored thereon that, when executed by the processor, causes the control system to:
   initialize, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot, moving the legged robot according to the task, and wherein the parameters are defined based on a weighted combination of a set of basis functions, the set of basis functions includes a linear basis function for a center of mass of the legged robot and a cycloidal basis function for feet of the legged robot;
   decode the parameters to generate the reference trajectory;
   execute, in response to receiving a feedback signal indicative of a change of a state of the legged robot moving according to the reference trajectory, the probabilistic filter to iteratively track the state of the reference trajectory satisfying a performance objective with respect to the state of the legged robot to update the parameters;
   update the reference trajectory by decoding the updated parameters;
   generate control inputs to actuators of the legged robot based on the updated reference trajectory; and
   control the actuators of the legged robot based on the corresponding control inputs.

2. The control system of claim 1, wherein the probabilistic filter is configured to:
   predict a current state of the reference trajectory based on a previous state of the reference trajectory using a prediction model;
   accept the feedback signal indicative of one or a combination of a current state of the legged robot and a state of an environment surrounding the legged robot; and
   update the current state of the reference trajectory based on the feedback signal using a measurement model testing the performance objective subject to measurement noise.

3. The control system of claim 2, wherein the feedback signal is accepted in response to detecting a new touch with a surface by at least one leg of the legged robot.

4. The control system of claim 3, wherein the feedback signal is configured to control the operation of at least a stance controller and a swing controller associated with the legged robot.

5. The control system of claim 4, wherein each of the stance controller and the swing controller is configured to generate torque commands for the operation of the legged robot, based on the feedback signal.

6. The control system of claim 2, wherein the prediction model is an identity model subject to process noise predicting the state of the reference trajectory within a variance defined by the process noise.

7. The control system of claim 1, wherein the performance objective comprises one or a combination of requirements for (i) a desired foot clearance/step height of the legged robot, (ii) a desired walking speed of the legged robot, (iii) a desired turn rate of the legged robot, (iv) a desired stair height for climbing stairs, (v) a desired energy consumption of the legged robot, (vi) a desired foot slippage of the legged robot, and (vii) a desired ground reaction force of the legs of the legged robot.

8. The control system of claim 1, is further configured to:
   receive the task from a supervisory controller;
   select predetermined parameters from a database based on the task; and
   initialize the parameters of the probabilistic filter with the selected predetermined parameters.

9. The control system of claim 8, further configured to:
   initialize the parameters of the probabilistic filter with a predetermined set of parameters associated with a reference trajectory related to the received task;
   determine a set of performance objectives for the received task; and
   update the parameters associated with the reference trajectory related to the task to satisfy the performance objective.

10. The control system of claim 1, wherein the task comprises one or a combination of walking straight, turning right or left, climbing stairs, high-stepping gait, and trotting.

11. The control system of claim 1, wherein the probabilistic filter is an extended Kalman filter (EKF) configured to compute a Kalman gain by computing a gradient of the performance objective.

12. The control system of claim 1, wherein the probabilistic filter is an unscented Kalman filter (UKF) configured to compute a Kalman gain by evaluating the control parameters with respect to the performance objective.

13. A method for controlling a legged robot, the method comprising:
   initializing, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot moving the legged robot according to the task, and wherein the parameters are defined based on a weighted combination of a set of basis functions, the set of basis functions includes a linear basis function for a center of mass of the legged robot and a cycloidal basis function for feet of the legged robot;
   decoding the parameters to generate the reference trajectory;
   executing, in response to receiving a feedback signal indicative of a change of a state of the legged robot moving according to the trajectory, the probabilistic filter to iteratively track the state of the reference trajectory satisfying a performance objective with respect to the state of the legged robot to update the parameters;
   updating the reference trajectory by decoding the updated parameters;
   generating control inputs to actuators of the legged robot based on the updated reference trajectory; and controlling the actuators of the legged robot based on the corresponding control inputs.

14. The method of claim 13, further comprising:

predicting a current state of the reference trajectory based on a previous state of the reference trajectory using a prediction model;

accepting the feedback signal indicative of one or a combination of a current state of the legged robot and a state of an environment surrounding the legged robot; and updating the current state of the reference trajectory based on the feedback signal using a measurement model testing the performance objective subject to measurement noise.

15. The method of claim 14, wherein the feedback signal is accepted in response to detecting a new touch with a surface by at least one leg of the legged robot.

16. The method of claim 15, wherein the feedback signal is configured to control the operation of at least a stance controller and a swing controller associated with the legged robot.

17. The method of claim 16, wherein each of the stance controller and the swing controller is configured to generate torque commands for the operation of the legged robot, based on the feedback signal.

18. The method of claim 14, wherein the prediction model is an identity model subject to process noise predicting the state of the reference trajectory within a variance defined by the process noise.

19. A non-transitory computer readable medium storing a program causing a legged robot to execute a reference trajectory state generation process, the process comprising:

initializing, in response to receiving a task, a probabilistic filter with parameters associated with a state of a reference trajectory of the legged robot, wherein the parameters are predetermined for the task and encode the reference trajectory including a combination of different trajectories for coordinated motion primitives of different actuators of the legged robot moving the legged robot according to the task, and wherein the parameters are defined based on a weighted combination of a set of basis functions, the set of basis functions includes a linear basis function for a center of mass of the legged robot and a cycloidal basis function for feet of the legged robot;

decoding the parameters to generate the reference trajectory;

executing, in response to receiving a feedback signal indicative of a change of a state of the legged robot moving according to the trajectory, the probabilistic filter to iteratively track the state of the reference trajectory satisfying a performance objective with respect to the state of the legged robot to update the parameters;

updating the reference trajectory by decoding the updated parameters;

generating control inputs to actuators of the legged robot based on the updated reference trajectory; and controlling the actuators of the legged robot based on the corresponding control inputs.

* * * * *